June 2, 1942. M. C. INDAHL 2,285,206
KEYBOARD COMPOSING MACHINE
Filed Sept. 14, 1940 19 Sheets-Sheet 2
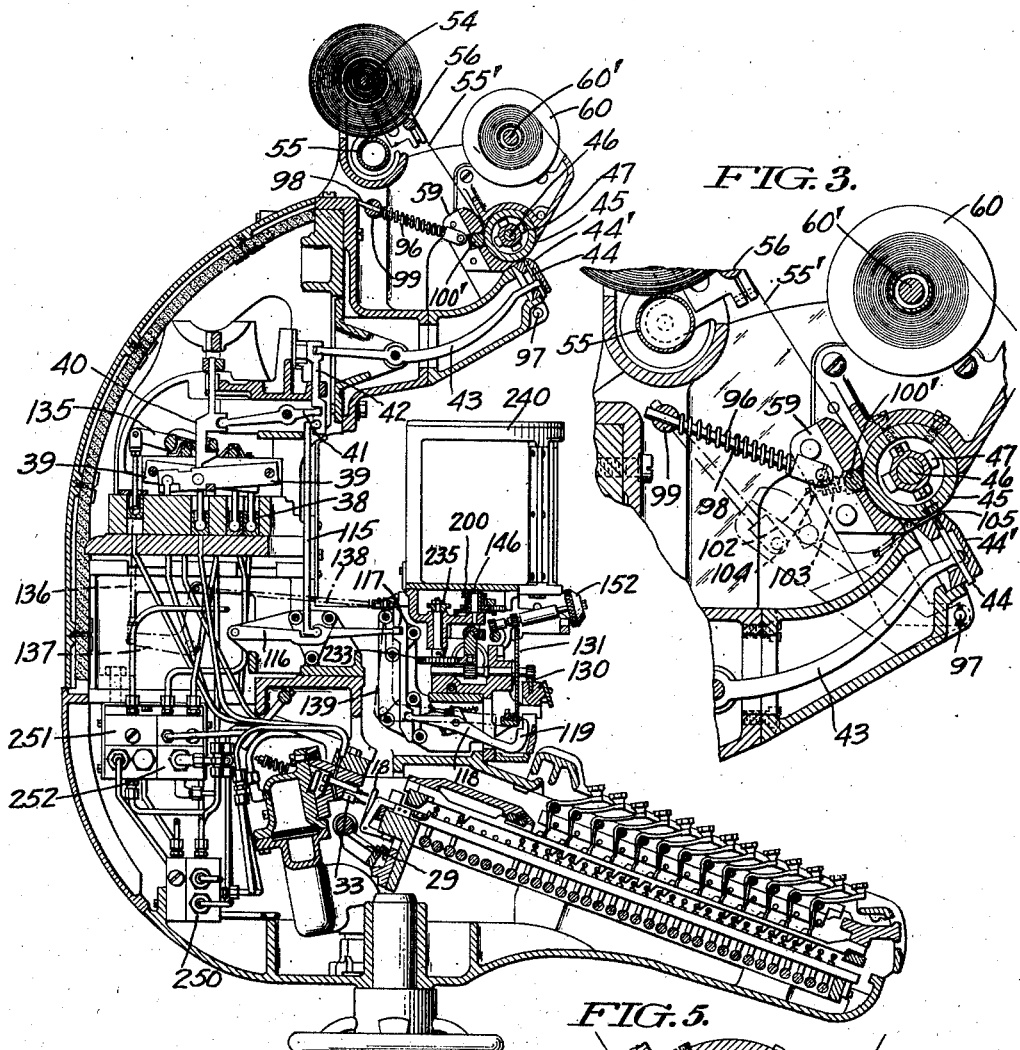
FIG. 2.
FIG. 3.
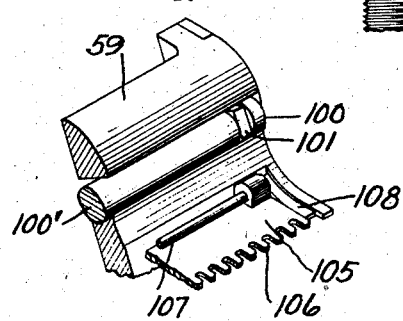
FIG. 4.
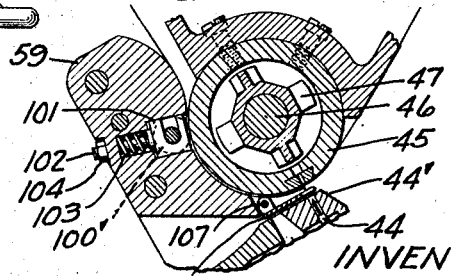
FIG. 5.
INVENTOR:
Mauritz C. Indahl,
BY John A. Ferguson
HIS ATTORNEY.

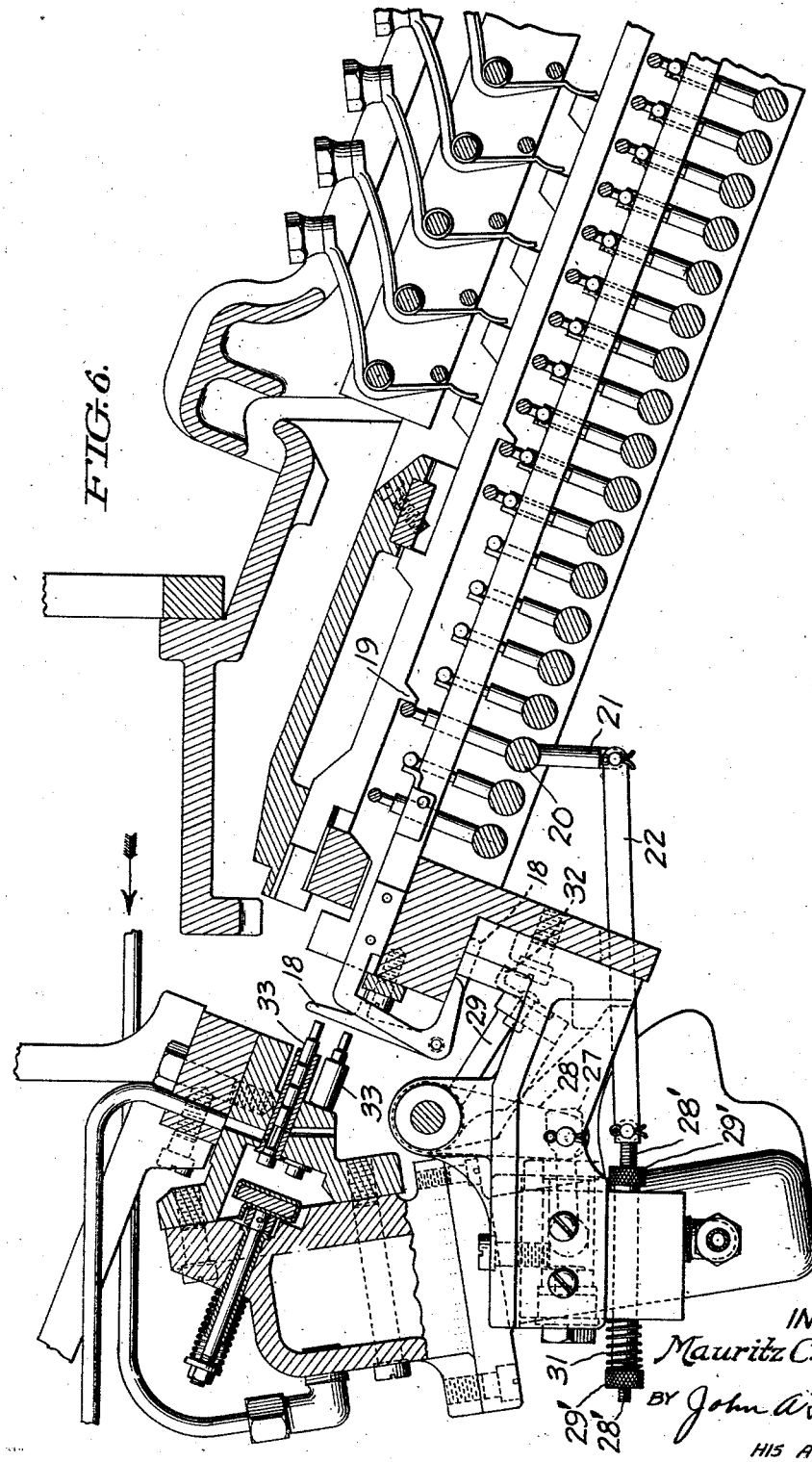

INVENTOR:
Mauritz C. Indahl,
BY John A. Ferguson
HIS ATTORNEY.

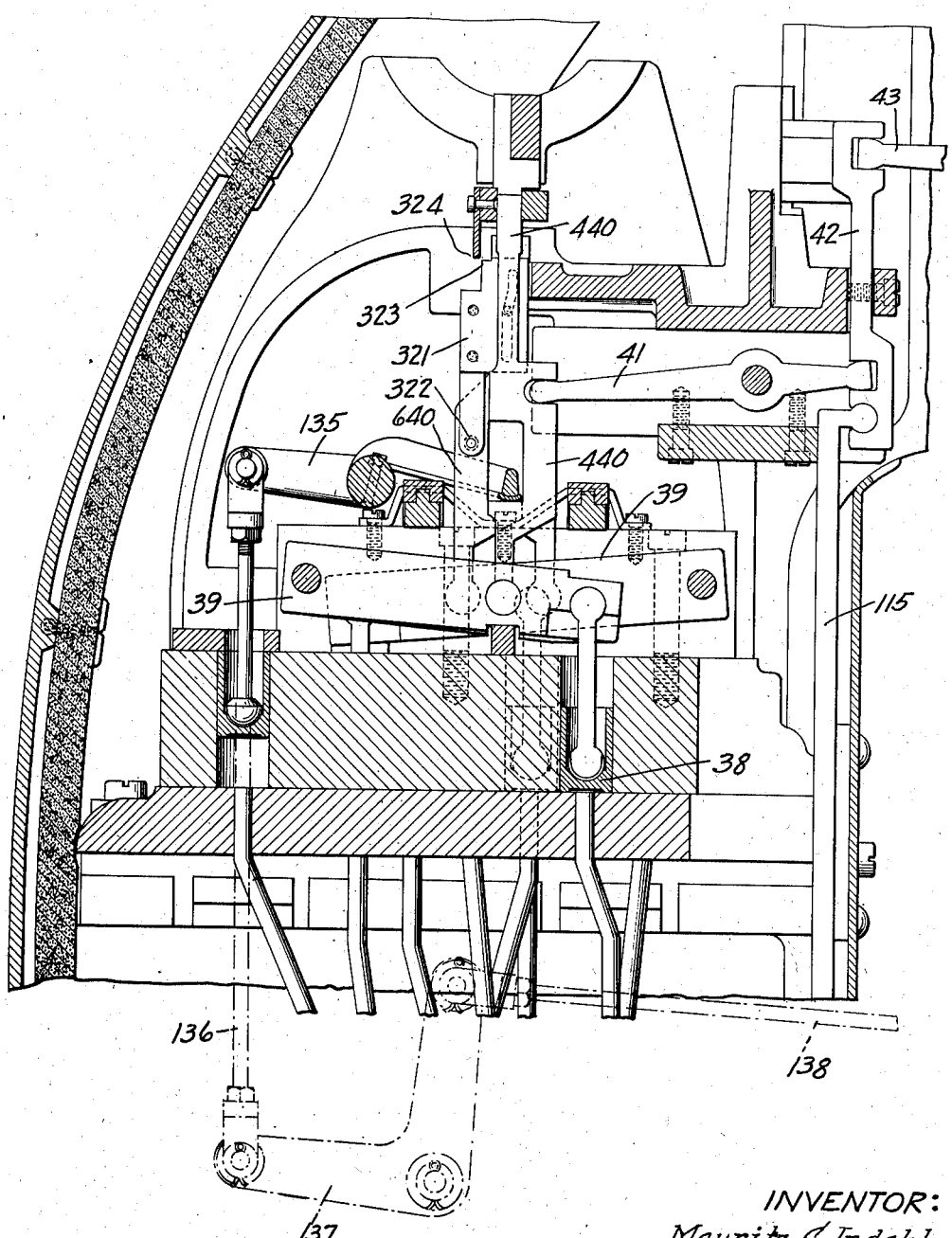

INVENTOR:
Mauritz C. Indahl,
BY John A. Ferguson
HIS ATTORNEY.

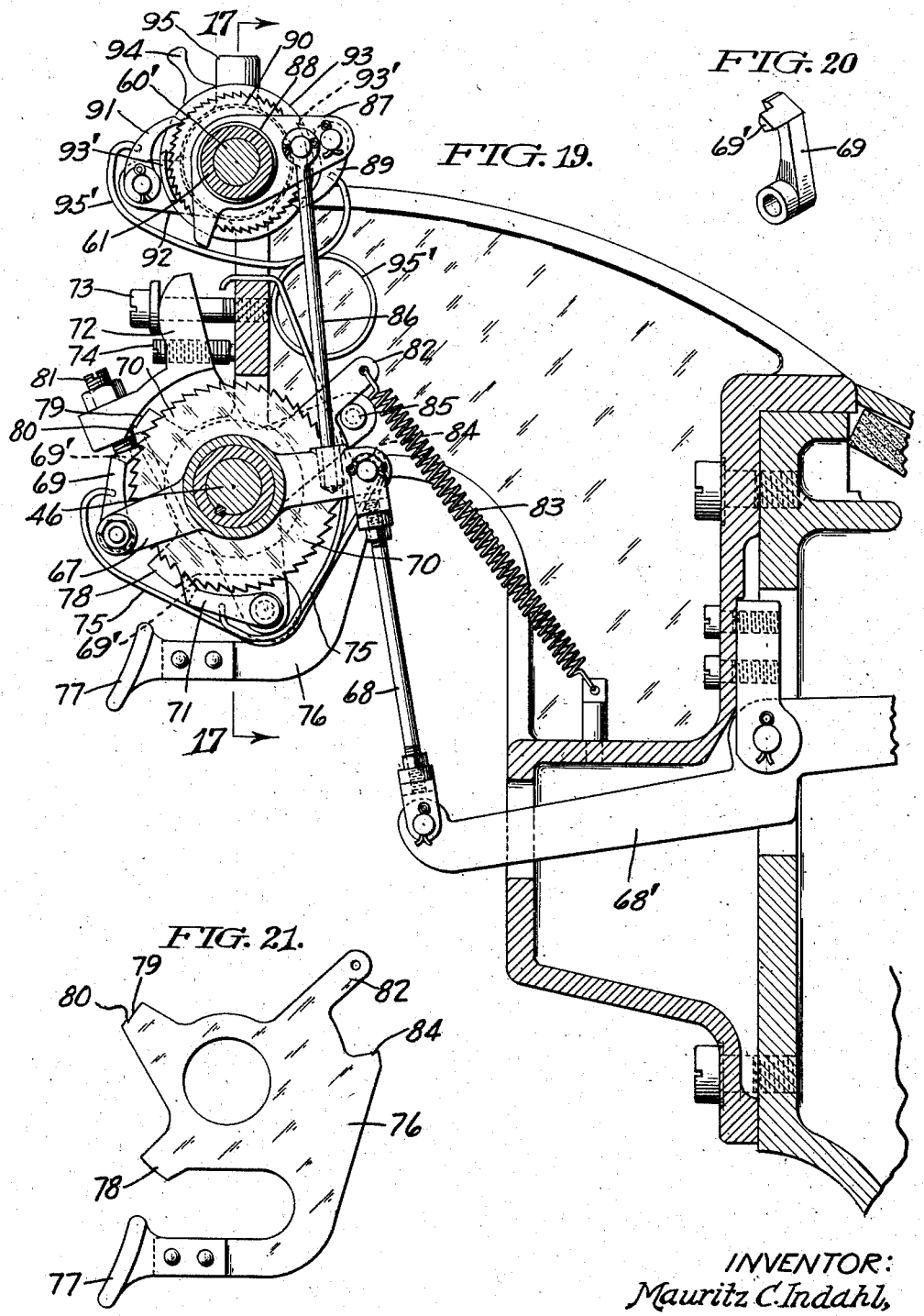

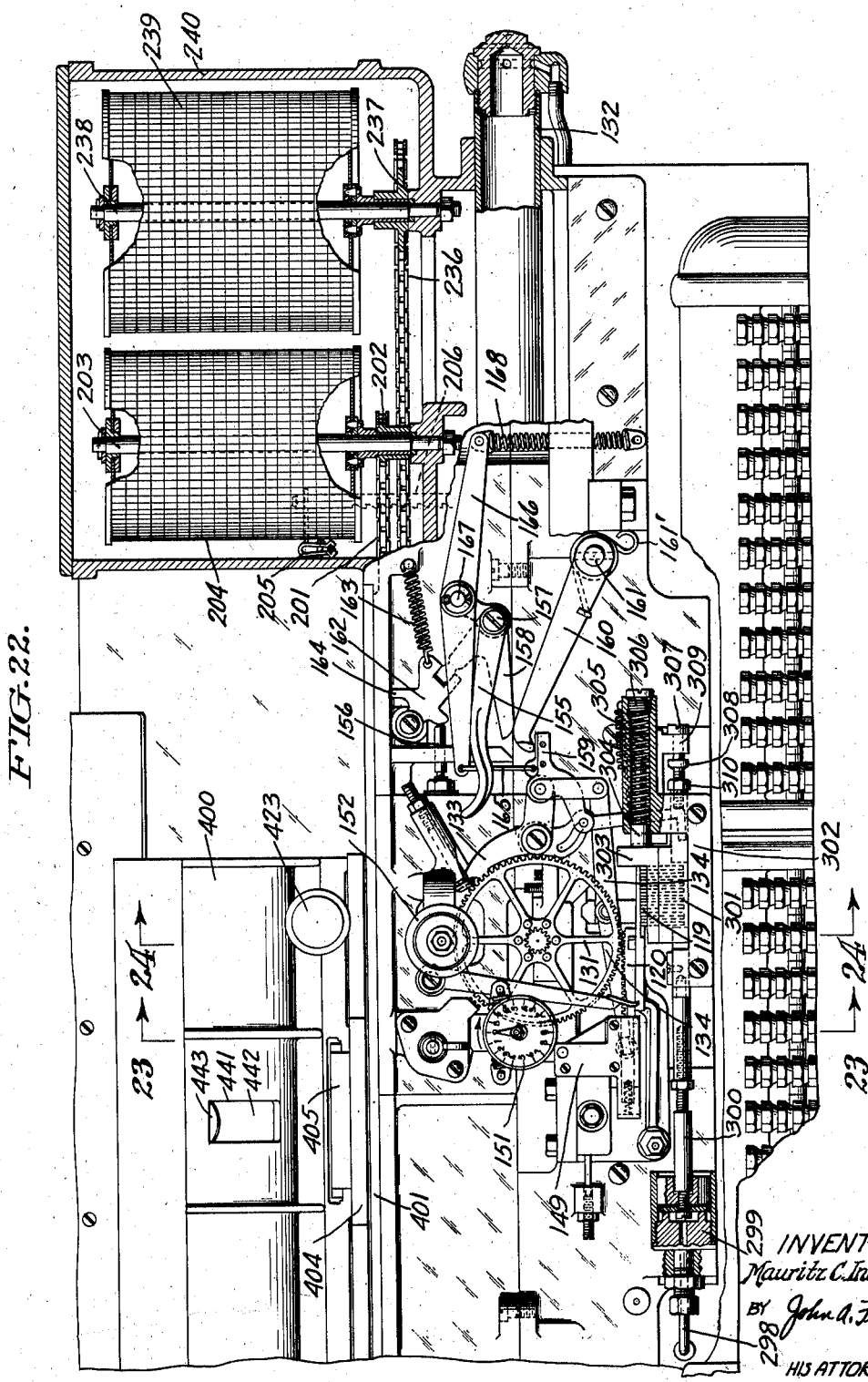

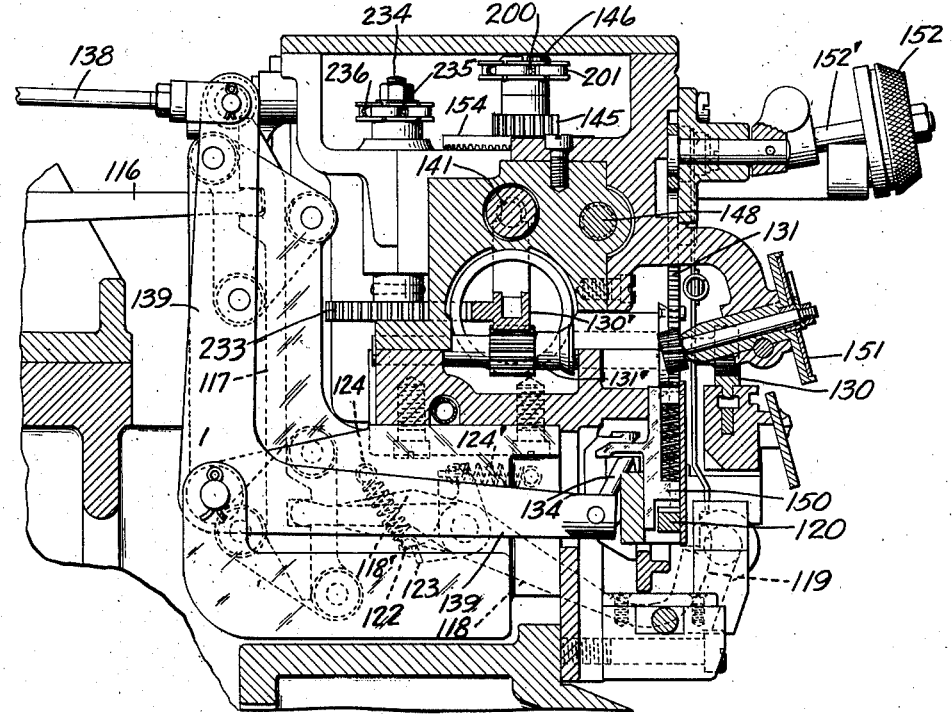
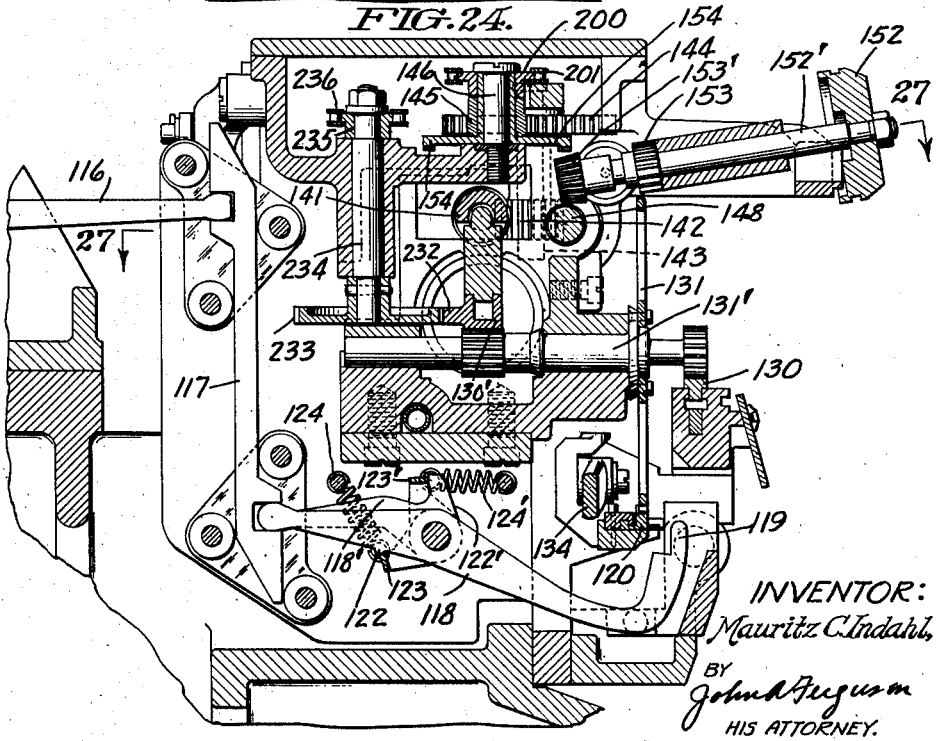

June 2, 1942.  M. C. INDAHL  2,285,206
KEYBOARD COMPOSING MACHINE
Filed Sept. 14, 1940  19 Sheets-Sheet 10
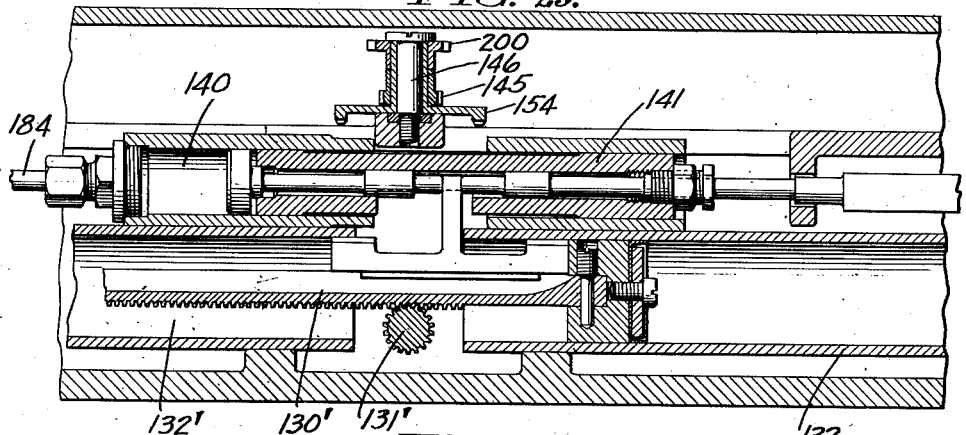
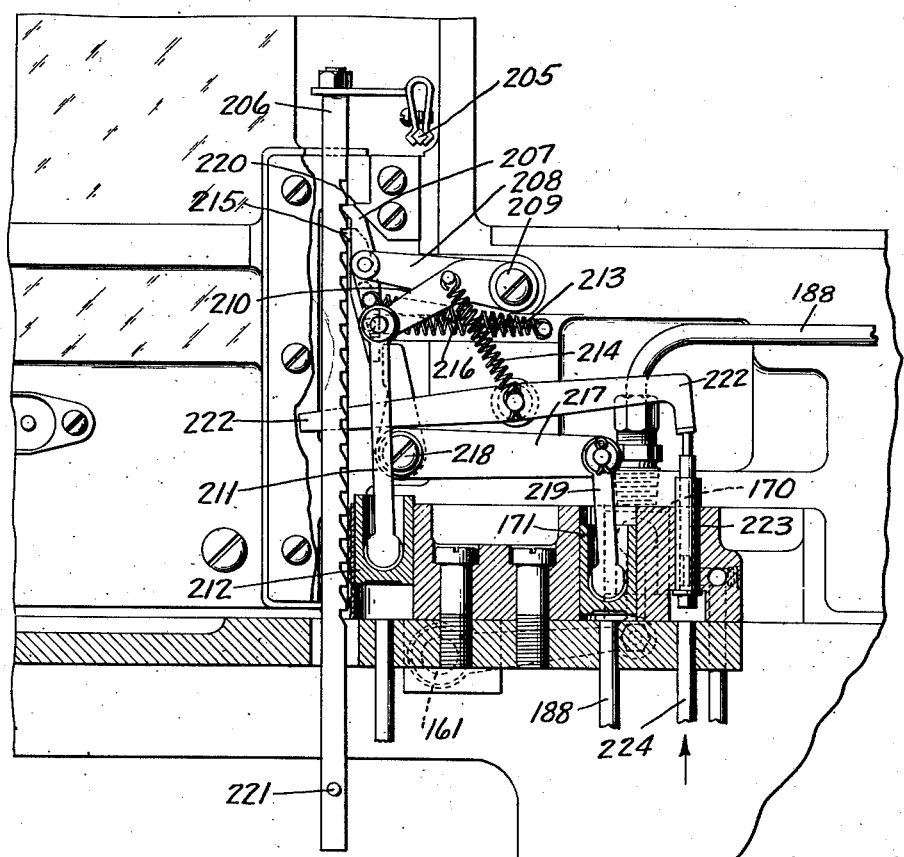
INVENTOR:
Mauritz C. Indahl,
BY John A. Ferguson
HIS ATTORNEY.

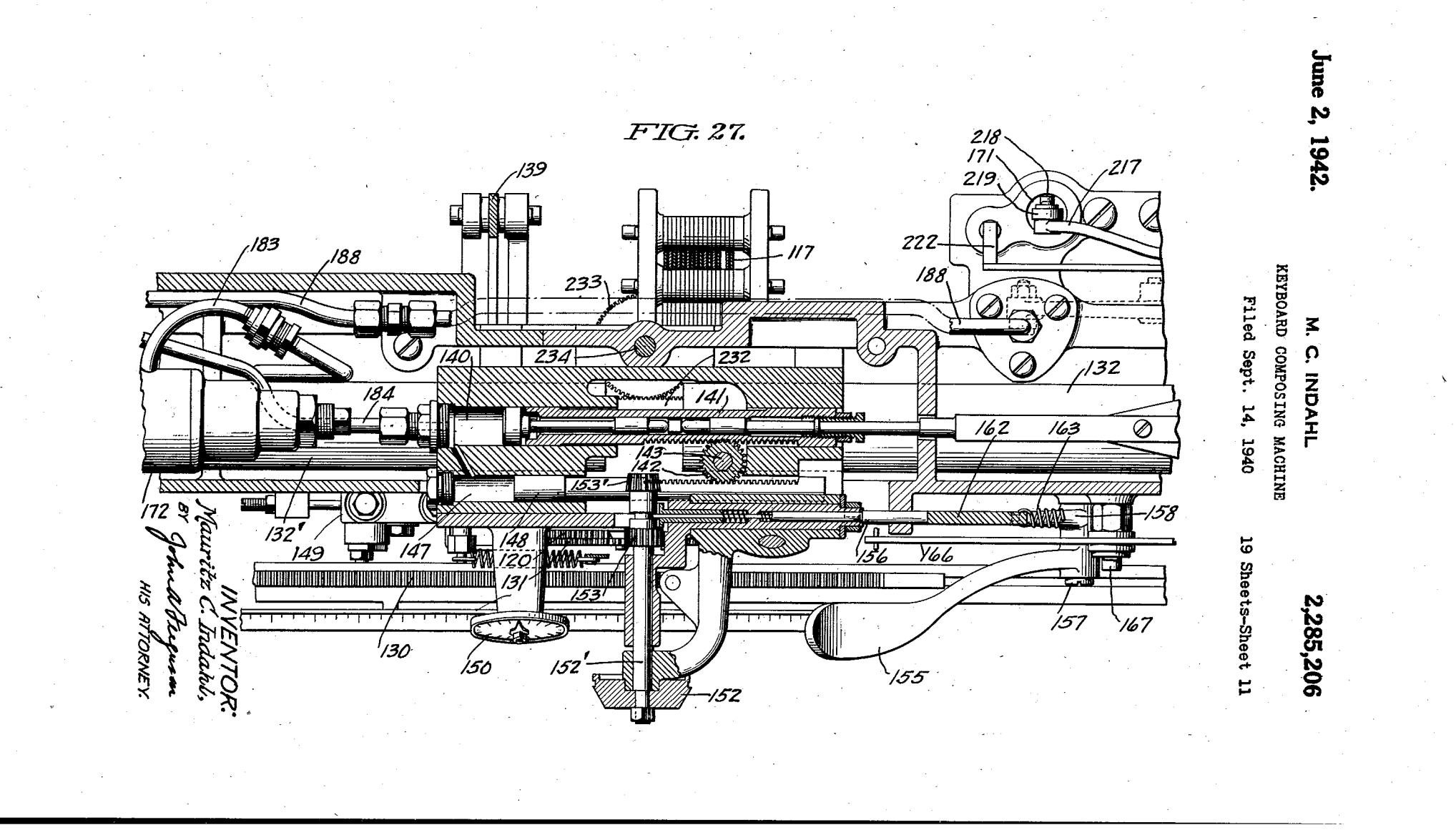

June 2, 1942. M. C. INDAHL 2,285,206
KEYBOARD COMPOSING MACHINE
Filed Sept. 14, 1940 19 Sheets-Sheet 12
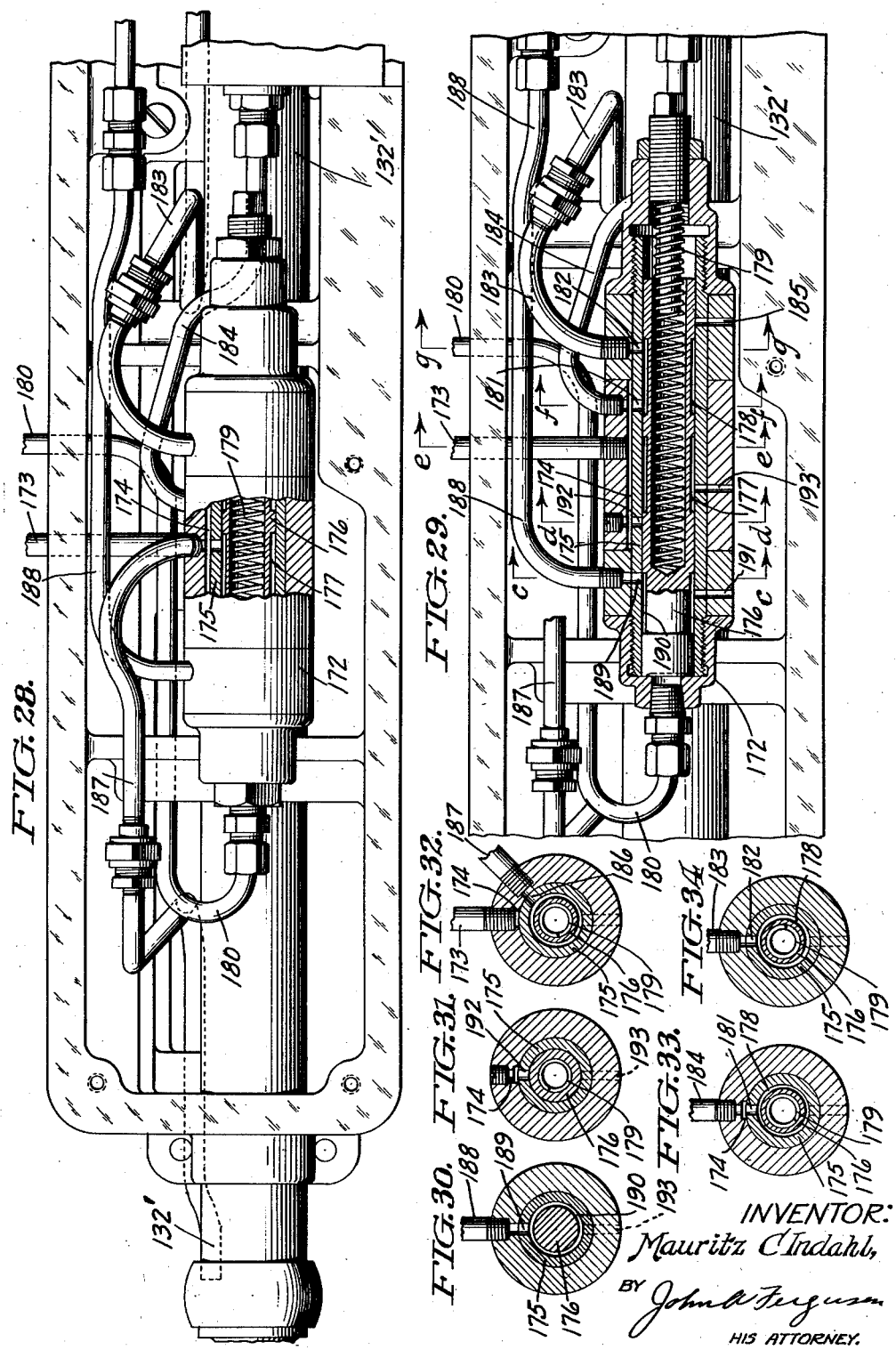

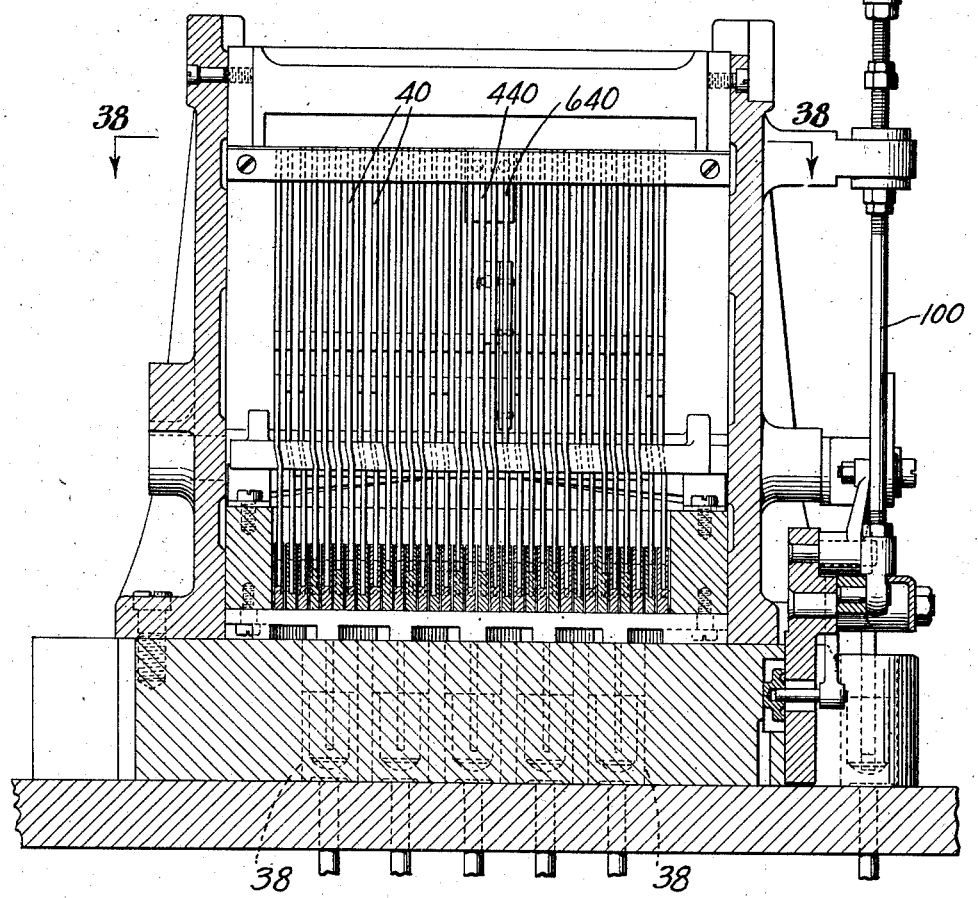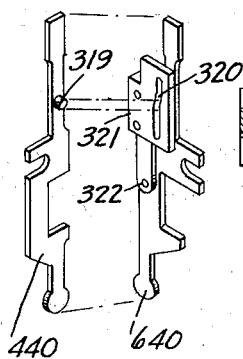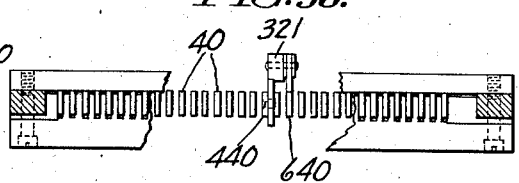

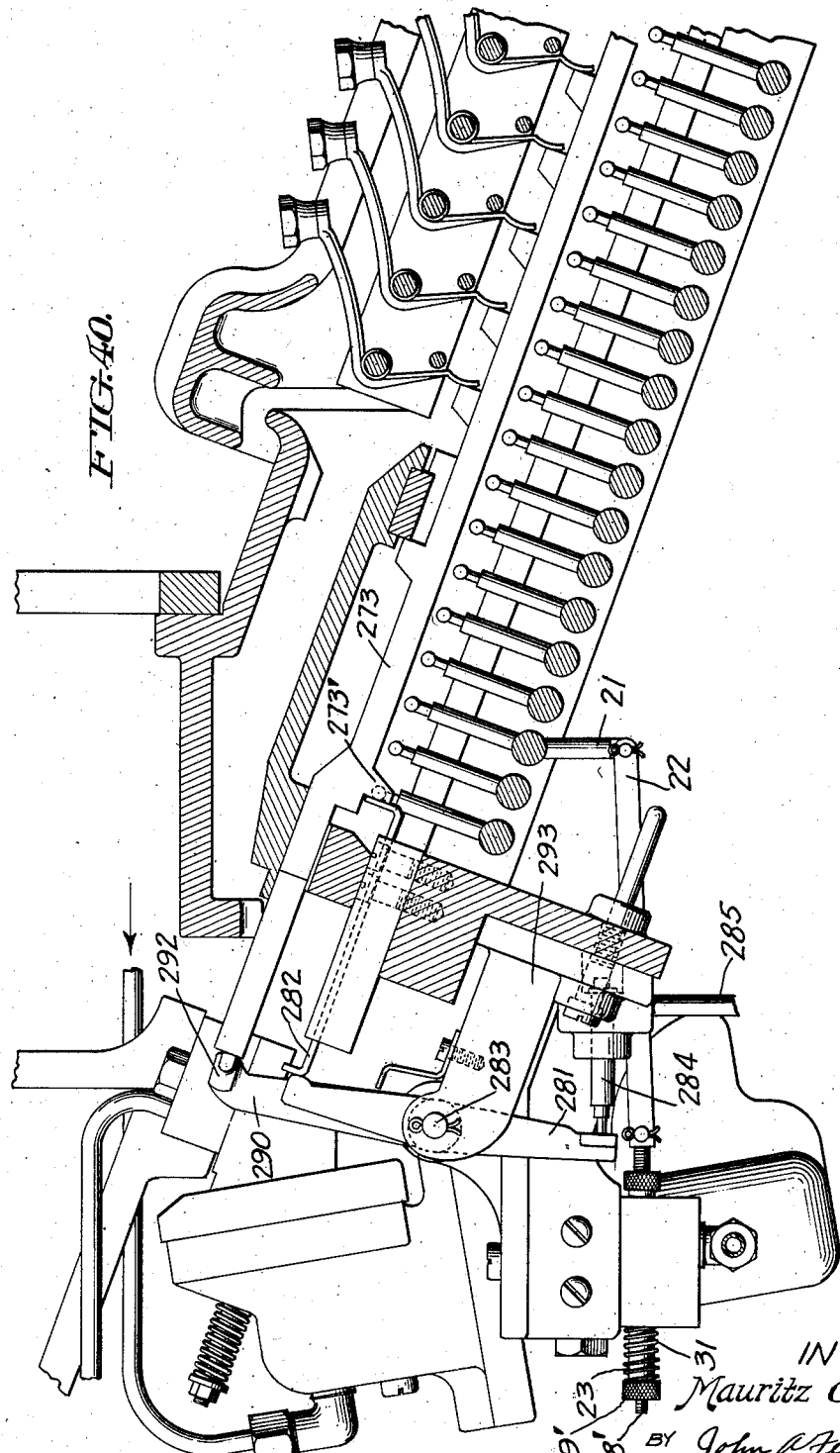

June 2, 1942.   M. C. INDAHL   2,285,206
KEYBOARD COMPOSING MACHINE
Filed Sept. 14, 1940   19 Sheets-Sheet 16
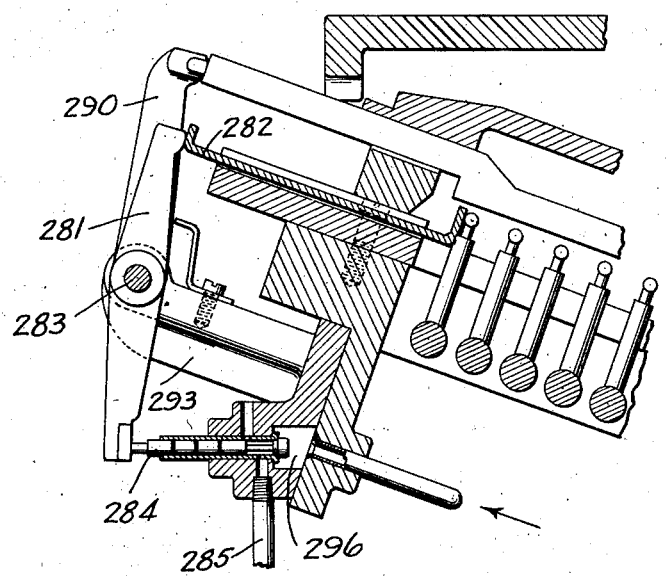
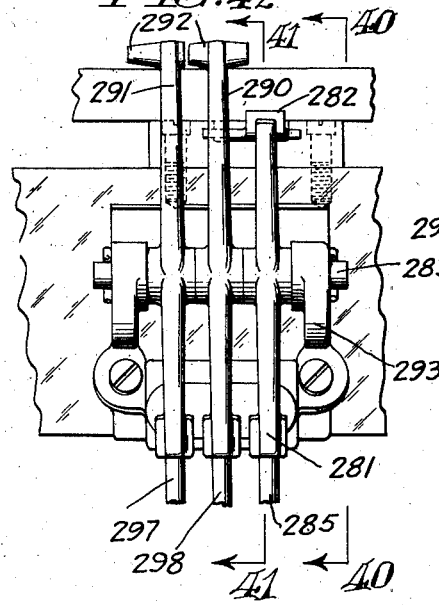
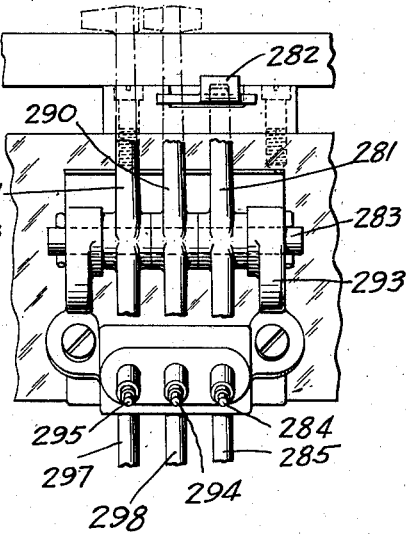
INVENTOR:
Mauritz C. Indahl,
BY John A. Ferguson
HIS ATTORNEY.

June 2, 1942.    M. C. INDAHL    2,285,206
KEYBOARD COMPOSING MACHINE
Filed Sept. 14, 1940    19 Sheets-Sheet 17

INVENTOR:
*Mauritz C. Indahl,*
BY *John A. Ferguson*
HIS ATTORNEY.

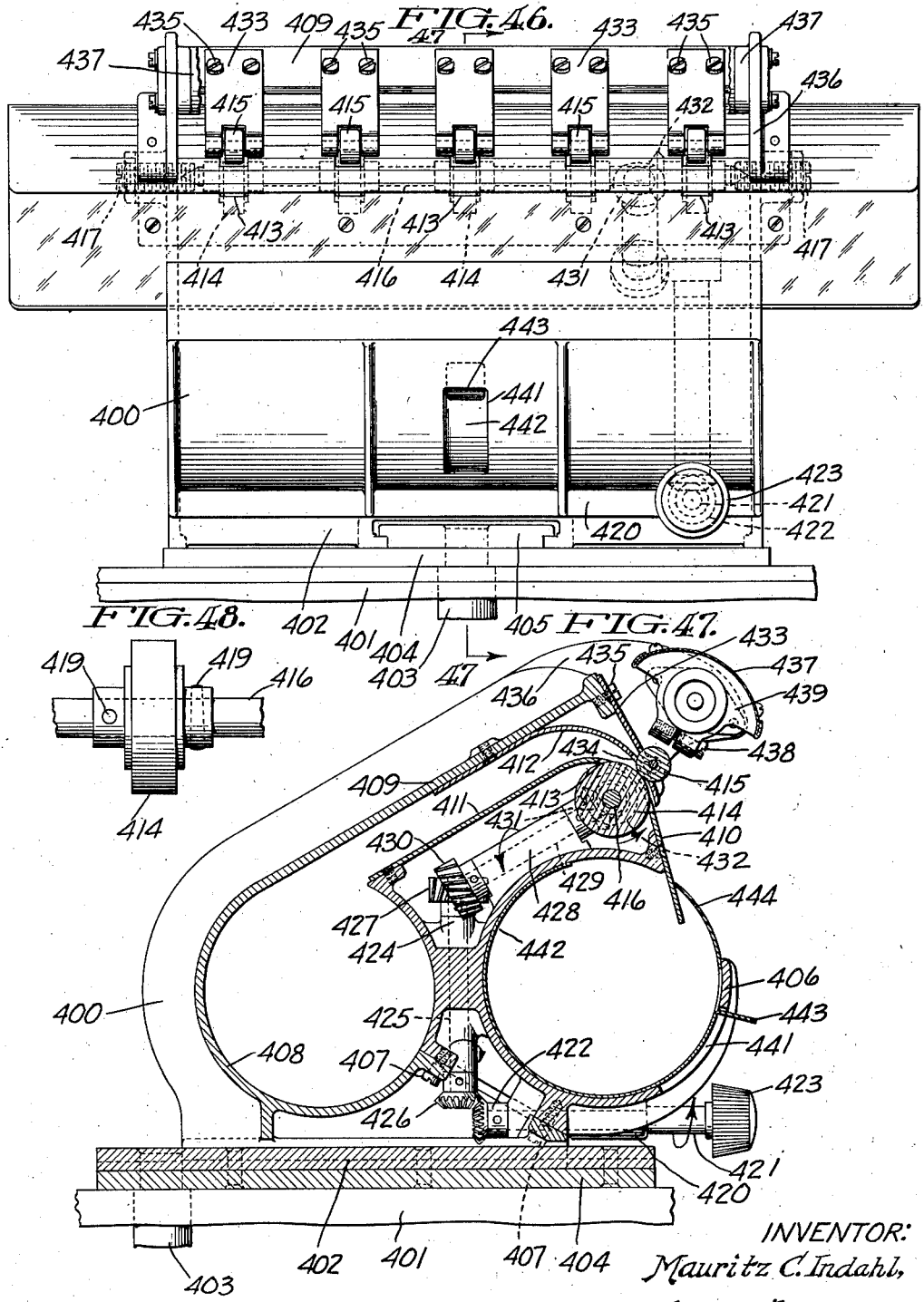

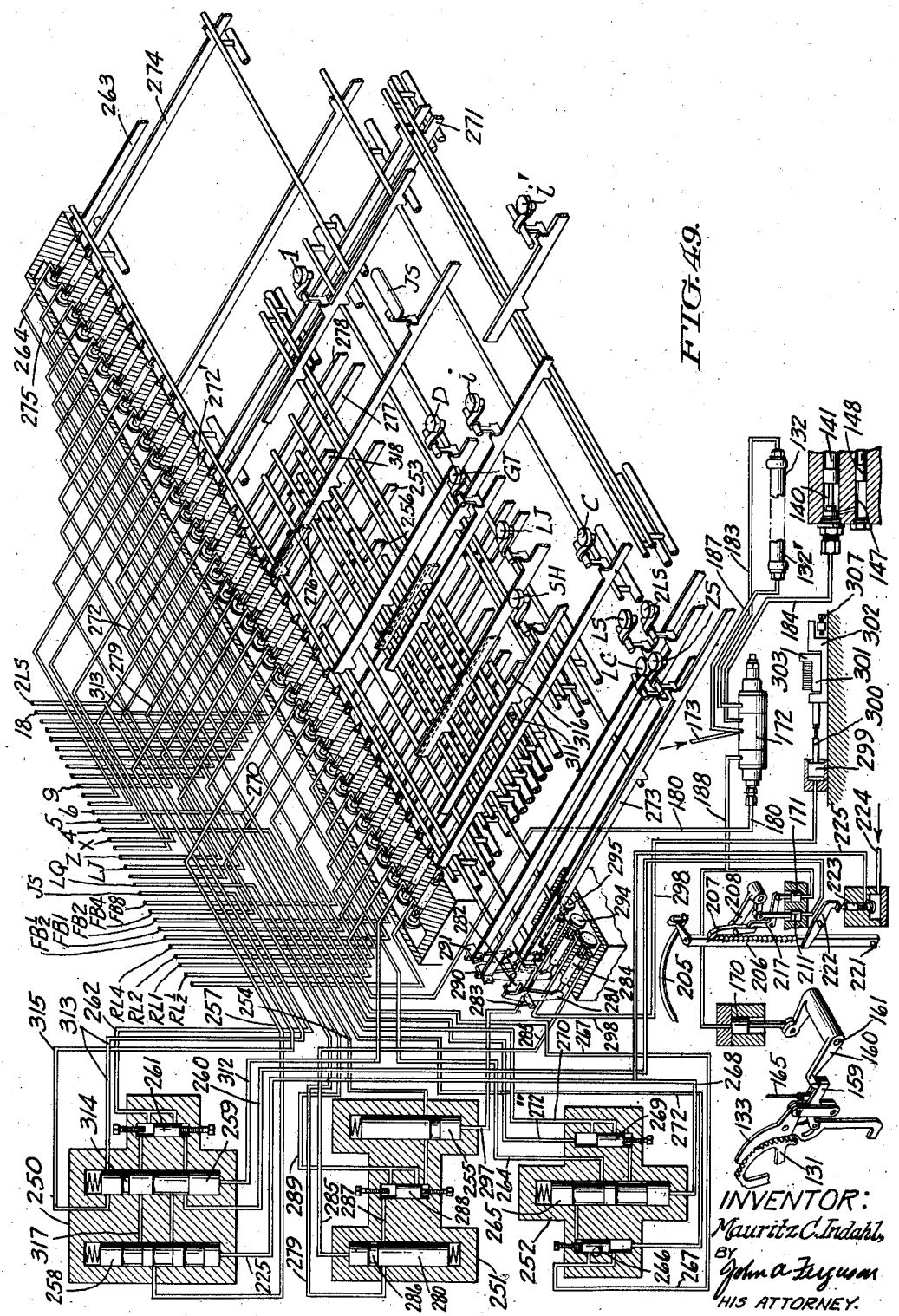

Patented June 2, 1942

2,285,206

UNITED STATES PATENT OFFICE 2,285,206

KEYBOARD COMPOSING MACHINE

Mauritz C. Indahl, Rydal, Pa., assignor to Lanston Monotype Machine Company, Philadelphia, Pa., a corporation of Virginia Application September 14, 1940, Serial No. 356,811

21 Claims. (Cl. 164—112)

This invention relates to keyboard composing machines in which a record strip is perforated in accordance with the keys struck or depressed by the operator, such perforations in the record strip or controller constituting signals for controlling an associated typecasting and composing or similar machine, the system as a whole being well known to those familiar with the equipment manufactured and sold for many years under the registered trade-mark "Monotype" by Lanston Monotype Machine Company.

The general construction of such a keyboard composing machine is disclosed in United States Letters Patent #944,405 issued to J. S. Bancroft and M. C. Indahl on December 28, 1909. It is among the objects of the present invention to improve upon the patented machine in its present commercial form by increasing its scope and flexibility, provide for a higher degree of typographic excellence in the final product, increase the speed of composition, provide for expeditious quadding and for centering of typographic matter; among other objects are the provision of improved controller strip guiding and perforating mechanism, of a motor means for operating a variable number of punches with evenness and lightness of touch to the operator's fingers upon the keys, of an improved paper feed mechanism and for the disposal of nibs produced by the operation of perforating, for the proper and at times delayed action of the several parts of the mechanism by the provision of relay and other types of valves in the pneumatic system, for an improved mechanism for holding copy which it is desired to reproduce in the form of perforations in the controller and for accomplishing various new functions by the provision of special keys. Other objects will be pointed out hereinafter or will otherwise appear in the following description of the embodiment of the invention illustrated in the accompanying drawings forming a part of this specification, in which—

Fig. 2 is a vertical section on approximately line 2—2 of Fig. 1.

Fig. 3 is an enlarged detailed section showing the punching and controller guiding devices.

Fig. 4 is a detailed perspective view of the controller tension plate and associated parts.

Fig. 5 is a further enlarged section of the mechanism shown in Fig. 3 illustrating particularly the pressure roller for frictionally guiding the controller strip.

Fig. 6 is an enlarged vertical section of one of the plunger valves and of the rocker arms illustrating the connection for operating the motor for operating the plunger valves.

Fig. 16 is a vertical section through one of the punch operating pistons and associated parts.

Fig. 19 is a cross section through the paper feed and receiving spool mechanisms.

Fig. 20 is a detailed perspective of one of the pawls of the paper feed mechanism.

Fig. 21 is an elevation of a controlling key by which the operation of the paper feed mechanism is controlled.

Fig. 22 is a front elevation of a portion of the keyboard showing the measuring mechanism and the justification and quadding scales.

Fig. 23 is a vertical cross section of the measuring mechanism on approximately line 23—23 of Fig. 22.

Fig. 24 is a similar section on approximately line 24—24 of Fig. 22.

Fig. 25 is a vertical longitudinal section through the driving and reversing cylinder of the keyboard.

Fig. 26 is an elevation partly in section showing the justification drum pointer mechanism.

Fig. 27 is a horizontal section through approximately line 27—27 of Fig. 24.

Fig. 28 is a view partly in section of the valve device for reversing air pressure from the driving cylinder to the restoring cylinder and of the associated air control mechansm.

Fig. 29 is a vertical section through the valve shown in Fig. 28.

Fig. 30 is a cross section of the valve through approximately line c—c of Fig. 29.

Fig. 31 is a cross section on approximately line d—d of Fig. 29.

Fig. 32 is a cross section on approximately line e—e of Fig. 29.

Fig. 33 is a cross section on approximately line f—f of Fig. 29.

Fig. 34 is a cross section on approximately line g—g of Fig. 29.

Fig. 37 is a vertical section through the punch operating bars.

Fig. 38 is a section on line 38—38 of Fig. 37.

Fig. 39 is a perspective view of two neighboring and co-operating punch bars.

Fig. 40 is a section of the keyboard similar to Fig. 6 showing special valve bars for producing special keyboard functions, the section being approximately on line 40—40 of Fig. 42.

Fig. 41 is a detailed view of a portion of Fig. 40 showing a special plunger valve in section, said section being approximately on line 41—41 of Fig. 42.

Fig. 42 is an end elevation of the mechanism shown in Fig. 41.

Fig. 43 is a similar view, certain parts being broken away.

Fig. 44 is a development of the quadding and centering scale or drum.

Fig. 45 is a development of the justification scale or drum.

Fig. 46 is a front elevation of the copy holder.

Fig. 47 is a vertical section on approximately line 47—47 of Fig. 46.

Fig. 48 is an elevation of one of the pressure rollers of the copy holder; and

Fig. 49 is a schematic representation of the pneumatic system, showing certain keys and valves for controlling the air under pressure under varying conditions of key operation.

Figure 1:
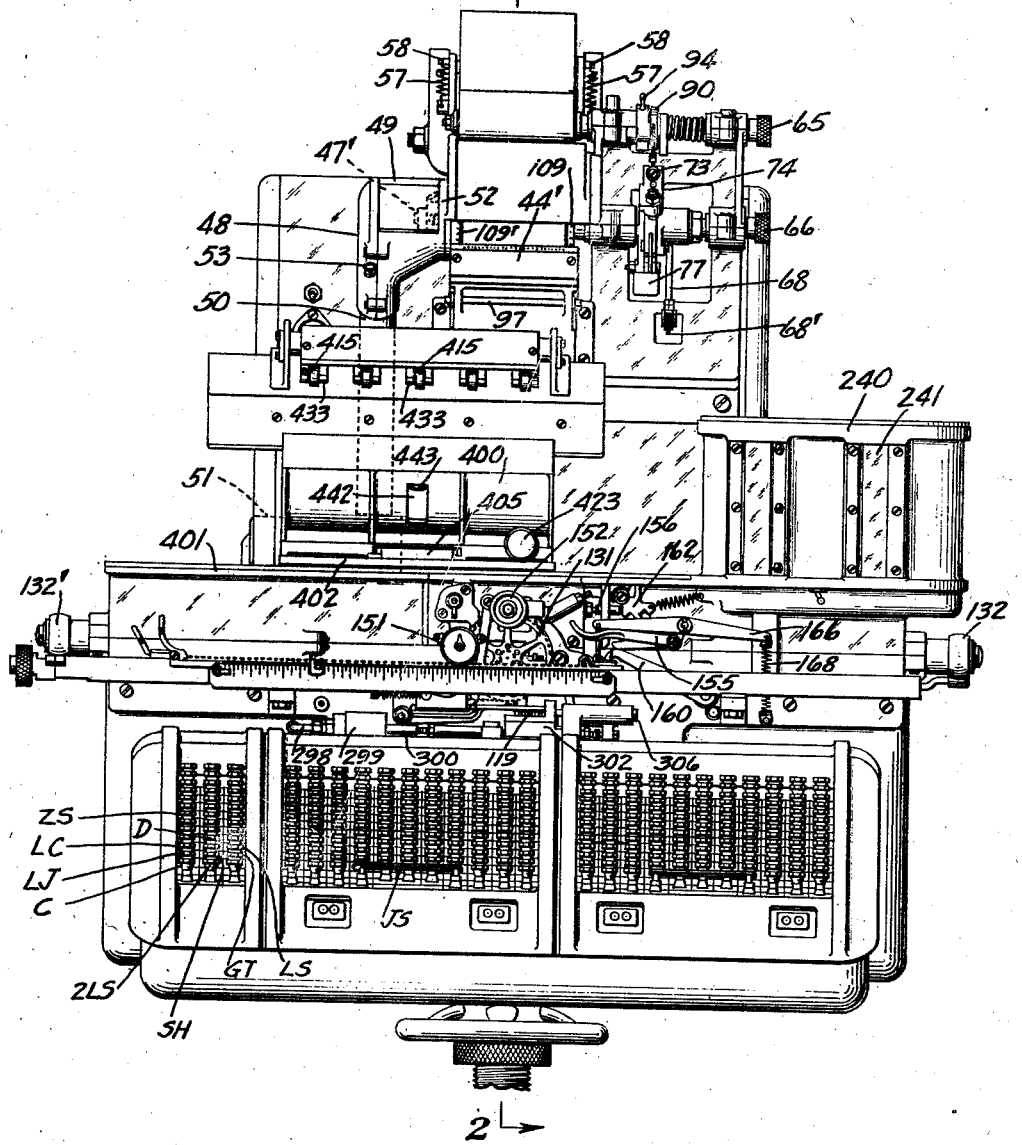
Fig. 1 is a front elevation of the upper structure of a keyboard composing machine embodying the present invention.
Figure 8:
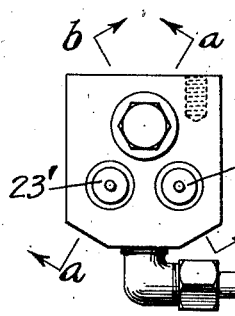
Fig. 8 is an end view of the motor block.
Figure 9:
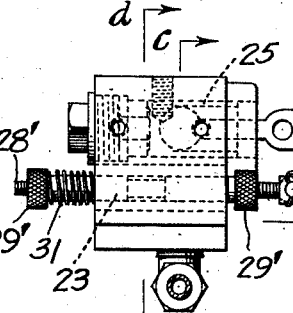
Fig. 9 is a side view thereof.
Figure 10:
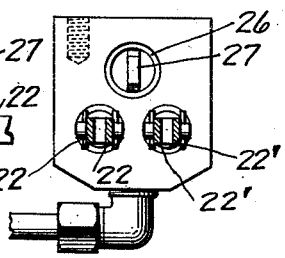
Fig. 10 is an end view thereof showing the opposite end from that shown in Fig. 8.
Figure 7:
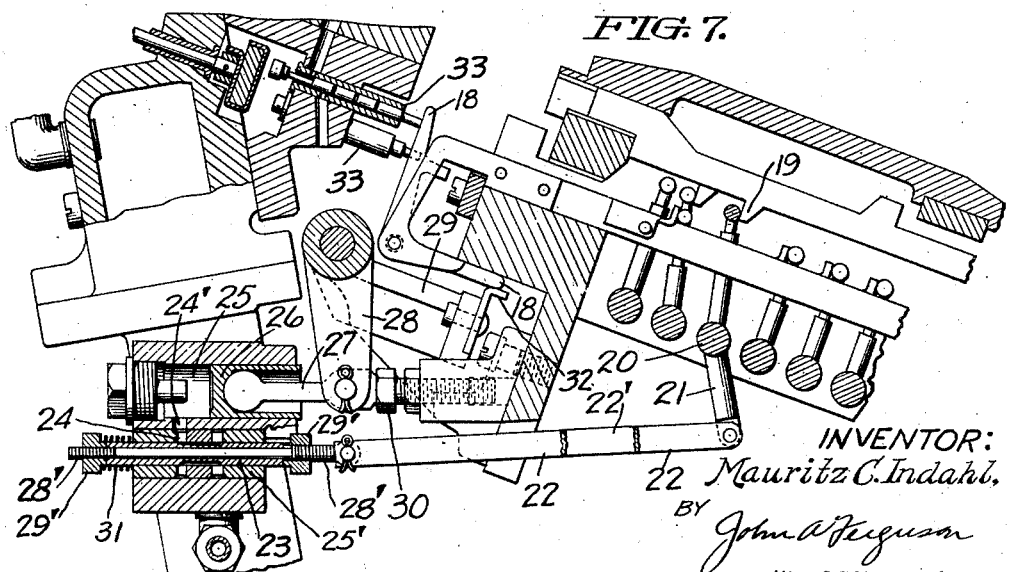
Fig. 7 is a similar section illustrating more clearly the construction of the motor.

The keyboard machine illustrated is similar in many respects to the well-known pneumatically driven commercial machine previously referred to in that it has key banks, keybars, rock shafts, bails and valve bars located at a proper distance above the floor for convenient operation, the upper structure including these parts being pivotally mounted on the usual type of base. The keys and replaceable keybanks and keybars are of well-known construction and are clearly shown in Figs. 1 and 2. The upper ends of the valve bars carry the bell-crank levers or tappets 18 such as are shown in United States Letters Patent #1,220,058 to J. S. Bancroft, M. C. Indahl and J. O. Hofberg dated March 20th, 1917 which refers back to 1,149,175. When a character key is depressed, it operates its associated keybar, and lugs on the lower edge of the keybar tilt the rock shafts in the usual manner to advance the appropriate valve bars toward the keyboard valves or plungers, which when opened admit air under pressure to the motors for the signal forming, usually punching elements. The bell-crank levers 18 do not operate the valves by the advance of the valve bars, but are only placed in position to do so when vibrated by the air motor now to be described. Each normal keybar is provided with a bottom lug 19 (Fig. 6) which causes the rock shaft 20 to rotate and the latter is provided with an extension 21 to the lower end of which is pivoted a connecting rod 22 pivoted at its rear end to the inlet slide valve 23 (Fig. 7). The rock shaft extension 21, the rod 22 and the valve 23 are duplicated alongside of each other, the second rod being indicated by 22' and the exhaust valve by 23'. When the slides 23—23' are pulled forward, air under pressure is permitted to traverse the passages 24 and 24' to the cylinder 25 for the motor piston 26. The piston is thus moved forward and through its rod 27 operates the bell-crank lever 28, one arm 29 of which is in position to engage the lower arm of the bell-crank 18. The rocking of the lever 28 thus, obviously, moves the levers 18 of the advanced valve bars and causes the upper arms of the levers 18 to open the corresponding keyboard valves and allow air to operate the signal forming element bars, usually punches. An adjustable stop 30 is provided for the lever 28 and springs 31 return the slide valves 23—23' when the operator's finger is released from the key, and thus the motor cylinder 25 is exhausted. Thus the engine does not operate to repeat the signal, but only provides ample pneumatic power to make certain of the operation of any number of keyboard valves upon the depression of a key. The keyboard operation is, therefore, a light one and an even operation despite the fact that one key depression might operate only one valve bar and valve, while another might operate several.

Figure 14:
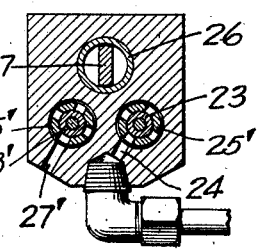
Fig. 14 is a similar section, but on approximately line c—c of Fig. 9.
Figure 15:
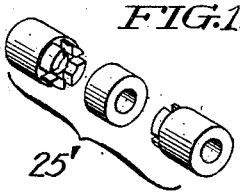
Fig. 15 is a perspective view of the motor valve construction, the parts being in sepaarted relation.

It is obvious that connecting rod 22 operates slide valve 23 while connecting rod 22' operates slide valve 23', both valves being located in a valve block in which the motor cylinder 25 is also provided. The valves 23 and 23' extend through sleeves 25' shown particularly in Fig. 15. These sleeves are made of three parts, the end parts comprising cylinders centrally bored for the valves 23 and 23' and having reduced diameter portions at their proximate ends, such portions being slotted, and a central portion consisting of a bored cylinder is seated tightly between the end parts. The slotted and reduced portions constitute air passages, the forward one for valve 23 connecting with the inlet port 24 and the forward one for valve 23' with the exhaust port 27' (Fig. 14). The other slotted and reduced portions of the sleeves communicate with the port 24' through the wall of the cylinder 25. The valves 23 and 23' are provided each with an annular groove for communicating with the slotted and reduced portions of the sleeve and are adjustable along an axial stem 28' which is screw threaded and provided with adjusting nuts 29' at each end, by the adjustment of which the annular groove of the valve may be micrometrically adjusted. A spring 31 for each valve 23, 23' tends to press the valve rearwardly in each case and assists in restoring the valve and keybars when the operator's finger is lifted from the key. The arm 29 of the bell-crank lever is provided with a striking bar 32 located below the lower arm of the valve bar tappets 18. The bar 32 extends across the keyboard, below all of the valve bars and tappets. As the bell-crank 28—29 is operated by the motor, its bar 32 strikes the tappets and when the valve bars carrying these tappets 18 are advanced by the depression of a key, the upper arms of such advanced tappets strike against the corresponding keyboard plungers or valves 33. The depression of a character or letter key, it will thus be seen, operates through keybars, rock shafts and bails to advance keybars corresponding to the signal the particular character is designed to produce and at the same time through the intermediary of the lug 19, the motor valves are operated to admit air to the motor cylinder through valve 23, resulting in the operation of the advanced bell cranks 18 as previously explained to open the keyboard valves 33. When the key is released, the advanced valve bars are kicked back by the air under pressure acting upon the valves 33 and the motor piston 26 is returned to inoperative position and the cylinder 25 is exhausted through valve 23' and exhaust port 27'.

Figure 11:
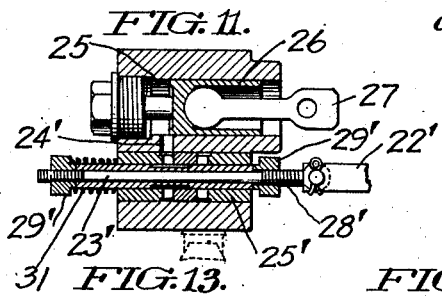
Fig. 11 is a section through the motor on approximately line a—a of Fig. 8.
Figure 12:
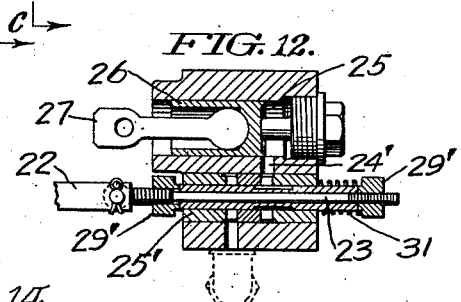
Fig. 12 is a section on approximately line b—b of Fig. 8.
Figure 13:
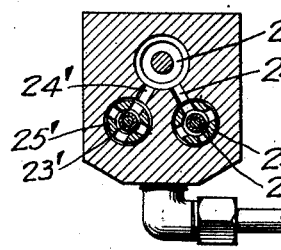
Fig. 13 is a section on approximately line d—d of Fig. 9.

It may be noted that in Fig. 7 the valve 23 is in position to permit air to enter into the cylinder 25. This air passes through the passage 24 (Fig. 14) into the forward air passages of the sleeve 25' and from there through the annular groove of the valve into the rearward passages of the sleeve 25' from which point it enters into cylinder 25 through the port 24'. When the operator's finger releases the key, the springs 31 return the valves to the position shown in Figs. 11 and 12. During this movement, the annular groove of the inlet valve 23 cuts off communication with the entrance port 24 and then the annular groove of exhaust valve 23' establishes communication with the exhaust port 27'. These valves are micrometrically adjusted so as to produce the proper timing for entry and exhaust of air. In the position shown in Fig. 11, the annular grooves are no longer in communication with the entrance and exhaust ports and this permits, in accordance with the adjustment, of only a partial exhausting of the cylinder 25 and produces a cushioning effect upon its piston. It is to be pointed out that this is a high speed machine. The operation of the parts described must be as fast as the manipulation of keys by the fastest operator. The provision of double valves, one for admission and one for exhaust, and their independent adjustment is highly important. The condition of the air varies as does also its pressure in various locations of use and it has been found that the setting of the two valves must be delicately coordinated so that entrance and exhaustion of air be controlled to produce the highest and smoothest speed in the working of the machine. Enough air must be admitted to cause the motor to do its work, but not more than is necessary because that air must be sufficiently exhausted in the half-cycle of the key stroke, this being a matter of a very small fraction of a second. The dual valve adjustment permits of this smooth operation and prevents chattering or double firing of the operated paper punches, as well as preventing other misoperations of the machine due to the very high speed at which it is required to work. The punch motors 38 are operatively connected to the plungers 33 and cause levers 39 to raise punch operating bars 40, the latter operating upon forwardly extending levers 41. The other ends of these levers move the bars 42 which are coupled to the punch levers 43 extending forwardly and upwardly and carrying on their front ends the punches 44 guided in the frame 44'. The coupling of these parts is generally of usual construction and is clearly shown, particularly in Fig. 2. There are 31 punches in the present commercial keyboard and the record strip or controller is of appropriate width or the usual width employed in commercial machines of the kind represented by the patents hereinbefore mentioned.

Figure 17:
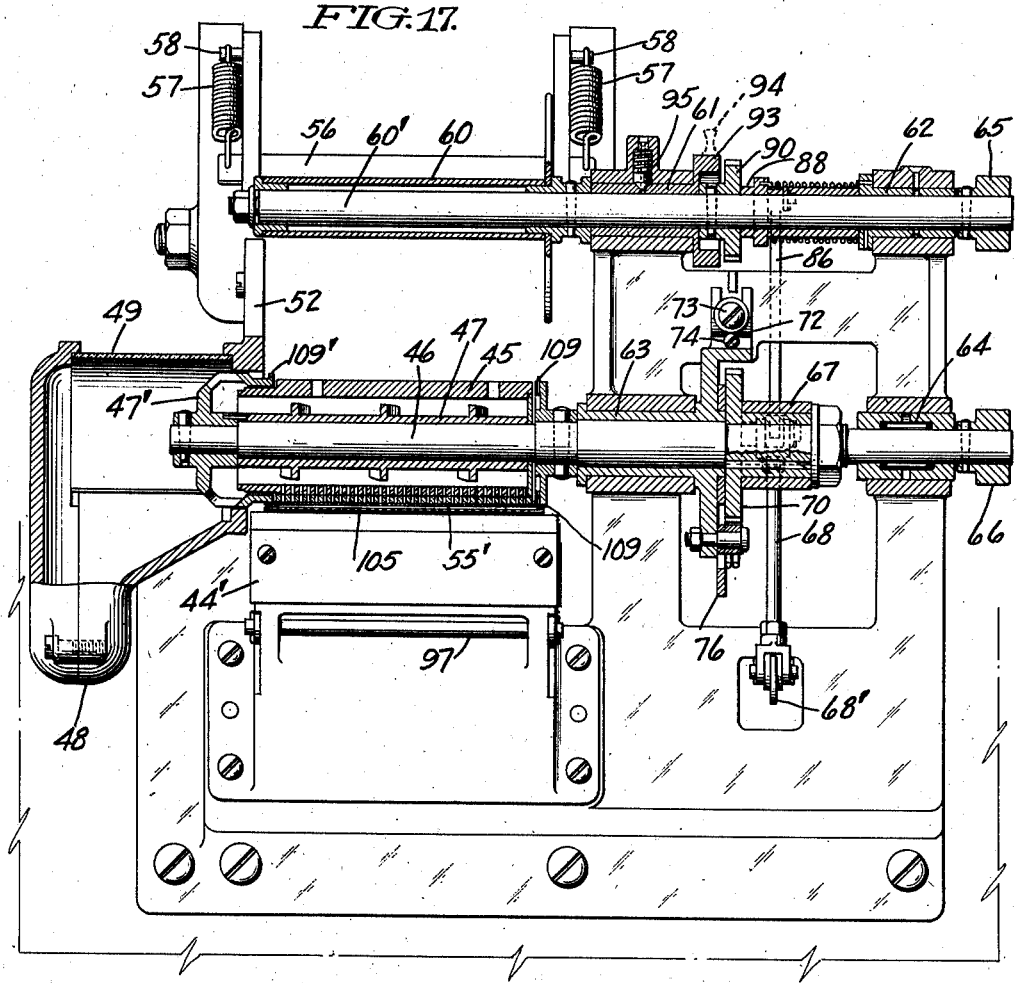
Fig. 17 is a section approximately on line 17—17 of Fig. 19.
Figure 18:
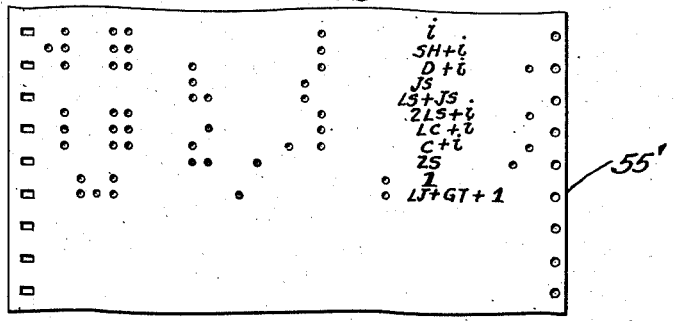
Fig. 18 shows a fragment of the controller paper with various signal perforations therein.

The usual punch dies are secured to a cylinder 45 (Figs. 5 and 17) which in this case is closed at the top, but open at both ends and through the axis thereof extends a shaft 46 carrying a sleeve 47 with angular vanes. At the outer end of the shaft a cap 47' is provided which has apertures so that when the shaft rotates, the vanes propel the nibs cut from the controller strip by the punches and the resulting paper particles and dust are led toward the cap, and from the apertures therein fall into receptacle 48, the upper part of which is closed by a transparent window 49. From the receptacle the nibs fall into a conduit 50 which extends in a general vertical direction downwardly and rearwardly to a drawer 51 at the side and rear of the machine as indicated in dotted lines in Fig. 1. The cap 47' extends beyond the guiding wall 52 for the paper, and the particles or nibs are thus caused to fall almost vertically into the receptacle 48. These particles are often charged with static electricity and tend to bunch together and resist flow so that this easy, vertical exit is important as is also the provision of a suitable wire pusher 53 (Fig. 1) extending down into the discharge tube 50 and terminating at the top end in a handle external of the receptacle 48, an aperture being provided in the latter for the insertion of the pusher. This handle is convenient for the operator to grasp and move up and down occasionally to clear the tube 50 of any accumulations of bunched paper particles.

The blank controller paper in the form of a roll is supported on shaft 54 (Fig. 2) the ends of which are held in slots in the paper tower frame which includes the wall 52 previously mentioned. The roll is supported on the anti-friction roller 55 whether the roll is of full size or of diminished size. As it is used and the roll is diminished in diameter, the shaft 54 slides down the slots automatically. The paper 55' is brought from the bottom of the roll above the tension bar 56 which is slidable in upwardly extending slots in the paper tower frame and is held up against the roll at all times by the tension springs 57 (Fig. 1), the lower end of each of which is secured to the bar 56 outside the paper tower frame while the upper end of each is secured to a fixed pin 58 in said frame. Supporting the paper in this manner on the roller 55 and the tension bar 56 produces an automatic tension and also permits of easy unwinding of the roller. From the bar 56 the paper is threaded downwardly over the tension plate 59 and then around the punch cylinder 45 to the receiving or rewind spool 60, which is forward of and slightly below the supply roll on the shaft 54. The spool 60 is mounted on shaft 60' (Fig. 17) parallel to and above shaft 46, both shafts being supported in bearings formed in the paper tower frame, these bearings being both at one side of the controller paper, the paper feed drive mechanism being located between the bearings. The bearings for the shaft 60' are indicated at 61 and 62 and the bearings for the shaft 46 are indicated at 63 and 64. Each shaft at its end beyond the bearings 62 and 64 is provided with a knurled head or handle 65 and 66 respectively. The opposite end of shaft 60' is unobstructed and a special advantage of this construction is the easy removal of a roll of paper therefrom by merely slipping it off the end of the spool. The paper feed shaft 46 is provided with a sleeve 67 between the bearings 63 and 64 having radially extending arms, one of which is driven from connecting rod 68 and lever 68' and the other is provided with a pivoted driving pawl 69 co-operating with teeth on the periphery of the ratchet 70 keyed to shaft 46. The retaining pawl or dog 71 is secured to the adjusting device 72, adjustably locked, as is obvious, by operation of the screws 73 and 74 prevents rotation of the ratchet and shaft in the direction opposite to that in which it is driven.

Suitable springs 75 urge the pawl and the dog into contact with the ratchet teeth. A throwout device in the form of a plate 76 (Fig. 21) and provided with a pressure handle 77 is mounted coaxially with the ratchet and is provided with cam surfaced arms in juxtaposition to the pawls 69 and 71. Each pawl is provided with a side projection 69' shown in Fig. 20. When the handle is pushed by the operator, the cam 78 pushes against the projection 69' of the dog 71, throwing it out of contact with the ratchet and the cam 79 has the same action on the driving pawl 69. The forward edge of the cam 79 first contacts with the projection 69' and raises the pawl 69, further movement causing the part 69' to ride over the cam part just ahead of the nick 80 and finally ride on the cam part behind the nick. When the operator releases the handle 77, the spring 83 attached to the arm 82 of the plate causes a return movement until the pawl comes into contact with the stop 81 at which point the part 69' is seated in the nick 80 and the parts are locked until released by a subsequent stroke of the driving rod 68. A stop 84 coming against the pin 85 prevents overthrow of the plate 76 by the operator.

The arm of the sleeve 67 driven by the rod 68 is provided with a socket into which extends the lower end of the rod 86 which connects at its upper end with an arm 87 on the sleeve 88 rotatable on the shaft 60'. This arm 87 is provided with a drive pawl 89 for co-operation with the teeth of the ratchet 90 keyed to the shaft 60'. A retaining pawl or dog 91 is carried on a fixed arm 92 to prevent back rotation of the ratchet 90. The bearing sleeve 61 is radially extended at its end to form a collar 93 which has lateral projections 93' so that when the collar 93 is moved by the handle 94, these projections raise the pawls 89 and 91 from contact with the ratchet teeth to prevent their operation and allow the shaft to be rotated in either direction by the knurled head 65. A spring stop 95 holds the sleeve 61 in either position of the handle 94, as will readily be understood. A spring 95' normally maintains the pawls in contact with the ratchet teeth.

Thus the operator is enabled to throw both ratchets 70 and 90 out of operation by disengaging their pawls and to turn each shaft 46 and 60' in either direction to adjust the record strip as may be necessary. The feeding of the strip is immediately resumed, however, on the pressing of a key on the keyboard since the retaining plate 76 is released from its locked position by the keyboard movement of the sleeve 67 driven by the rod 68. The rod 68 connects at its lower end with the lever 68' which extends rearwardly and connects to the rod 100 (Fig. 37) with the operating motor and valve control for the paper feed which is of the same general construction as that shown in U. S. Letters Patent #944,405 previously mentioned.

Difficulty has heretofore been experienced in feeding a new strip of paper into the machine because of the narrow space provided in the neighborhood of the punches and dies. To obviate this, a rockable entrance tension plate 59 (Figs. 2 to 5) is provided, pivoted at 97 and shown in down position in Fig. 3 in dot-and-dash lines. A rod 98 leading from the plate 59 behind the same and slidable in a pivot 99 is surrounded by a compression spring 96, to maintain the plate in closed position or when manually pulled down beyond the dead center of the rod to maintain in open or down position. The plate 59 when open permits of easy threading of the paper between the punches and their dies and when in closed position provides a frictional brake and also acts to maintain the paper always in proper entering position.

The tension plate 59 is provided with a recess in its face for the reception of a roller 100'. This roller is pressed forward by two spring pressed yokes 101, each located in the recess of plate 59, the roller being reduced in diameter near each end thereof for the reception of these yokes. The yokes are provided with rods 102 extending rearwardly in cavities in the plate and being provided externally with an adjusting nut 104 and each surrounded by a spring 103 within the cavity to force the roller forwardly against the punch die cylinder or against the paper threaded around the cylinder when the tension plate 59 is in closed position. The nut 104 controls the degree of pressure against the paper. The filler plate or comb member 105 is pivoted to the tension plate 59 at 107 so that the comb enters into the space between the punches and dies. When the plate 59 is in down or open position, a large space is provided for threading the controller paper under the dies, but when the plate is closed, the comb member closes this space to a considerable extent, the comb member sliding under the dies and above the punches, being supported during this closing motion on the frame 44'. The teeth 106 of the comb are so located as to have the spaces between the teeth register with the dies and punches. Thus the paper is held closely against the punch die cylinder and is prevented from accidental removal or jumping off the tooth feeding wheels 109, 109' which feed the marginally perforated paper in the well-known manner. When a punch after moving upwardly to perforate the paper is removed from its die on its downward stroke, the comb teeth assist in stripping the paper from the punch and the construction is of high importance in insuring perfect punch and die operation at extremely high speeds. At the ends of the comb, the grooves 108 are formed in the plate 59 to present a clearance for the feeding pins 109, 109'.

As in the patented machine those punches which designate size are connected to the measuring mechanism. This connection includes for each such punch the vertical bar 115 pivotally connected at its top with the corresponding lever 41 through the corresponding bar 42 and at its lower end to an intermediate point of the lever 116 pivoted at its rear end on a fixed part of the machine frame and extending forwardly to engage pivotally with a vertically slidable bar 117 which at its lower end has a pivotal connection with the stop levers 118, 118'. These stop levers extend forwardly being pivoted at an intermediate point and have their ends form stops 119. The stops are in sidewise contact with each other and the operated stop when a key is struck is elevated into the path of motion of the units rack 120 (Fig. 22). The pivots of the levers 118, 118' are loose to allow the stops to move slightly laterally, and the stops are normally maintained in lowered position by springs 124, 124' (Fig. 24). Each lever 118 has a lug 122 against which the bar 123 of a yoke pivoted on the shaft on which the lever is pivoted contacts because of the action of spring 124 connected with the bar 123. Every alternate lever 118' has a lug 122' against which presses a yoke bar 123' similar to the bar 123, this yoke bar being under control of spring 124'. Each bar 118 is thus normally held down at its end carrying the stop 119 by a spring 124 and each alternate bar 118' is normally held down by the spring 124'. If a stop is elevated against its spring, its adjoining stops and bars on each side will not be elevated by friction between the bars because of the separate spring action on the adjoining bars to keep them in normal position.

The stops 119 are a part of the units measuring mechanism which is generally the same as is shown in the following U. S. Letters Patents issued to J. S. Bancroft and M. C. Indahl; #944,405 previously referred to; #1,149,176 August 10, 1915; #1,193,346, August 1, 1916; #1,283,624, November 5, 1918 and U. S. Letters Patent #1,256,765, February 19, 1918 issued to J. S. Bancroft and J. O. Hofberg.

From such patents and the commercial machine will be recognized such parts as the line scale rack 130, units wheel 131, units wheel shaft 131', units wheel driving rack 130', driving cylinder 132, the restoring cylinder 132', the units rack 120, the units wheel pawl 133 operated through the lever 134 which in this case is coupled with the universal bar 135 (Figs. 2, 23 and 16) through the rod 136, the bell crank lever 137, the rod 138 and the bell crank 139; the justification cylinder 140, and associated parts including the piston 141 with its side rack meshing with the pinion 142 on the vertical shaft 143, the upper end of which carries the gear 144 which meshes with the gear 145 on the vertical shaft 146; also the cylinder 147 and its piston 148 for operating the justification drum (Fig. 27), the units rack back stop mechanism 149 (Fig. 22) including the latch 150 (Fig. 23) and the indicator 151, geared to the units wheel; also the sectional justification mechanism represented by the knurled head 152 on shaft 152' provided with a gear 153 to mesh with the units wheel and a gear 153' to mesh with the gear 154 on the shaft 146; the finger operated lever 155, and the locking pin 156. As shown, the finger lever 155 is pivoted to the shaft 157 on which is also pivoted to act integrally with the finger lever the bell crank lever 158, the lower arm of which contacts with the operating link 159 for the units wheel pawl 133; this contact being made through the intermediary action of the tripping or restoring lever 160, pivoted at 161 and held in uppermost position by the spring 161'. The upper arm of the bell crank 158 has a loose action fit with the lower arm of bell crank 162 engaging the locking pin 156 to push it into action. The lever 162 is held yieldingly against this action by the spring 163 and the projection 164 comes against a portion of the frame of the machine which acts as a stop. Lost motion is provided between the restoring lever 160 and the link 159 so that the locking pin 156 is always operated before the link 159 is depressed and the pawl 133 withdrawn. The link 159 is normally held in upward position with the pawl 133 meshed with the units wheel by a link 165 connected with one end of the lever 166 pivoted centrally at 167, the opposite end of this lever being connected to the frame of the machine by a spring 168. The restoring lever 160 is operated otherwise than by the bell crank 158 by a motor 170 (Figs. 26 and 49). It will be seen that this motor is operated when the line justification key LJ is struck, in combination with another key to actuate the motor 26; also the motor 171 which trips the pawl of the justification scale pointer and allows the latter to fall to zero position. The striking of this key LJ, as will be seen from an inspection of Fig. 49, causes air to flow through pipe LJ to produce the justification signal. The first justification signal is produced while striking this LJ key and the key corresponding to the uppermost exposed figure on the justification scale and the second, by continuing to hold down the LJ key and striking the galley trip key GT as well as the key representing the lowermost figure on the justification scale. The galley trip key produces a signal represented by pipe RL4. Striking either the LJ or the GT key alone will not produce any result because the operated bails of the actuated rocker shafts are not provided with extensions 21 as shown in Fig. 6 and, therefore, the motor 26 is not set in operation. Restoring or reversing of the keyboard is accomplished when the LJ key is depressed together with a motor starting key. The restoring or reversing function is accomplished not merely by lifting the pawl 133 out of mesh with the units wheel 131, but also by reversing the action of the driving mechanism for the units wheel. The driving cylinder 132 is normally supplied with air under pressure and for restoring purposes this air must be exhausted and pressure admitted to the reversing cylinder 132', this result being obtained by striking the LJ key with a justifying key, as key 1. By referring to Fig. 49 it will be seen that air under pressure is thus admitted to the relay valve 172, construction of which is shown clearly in Figs. 28 to 34. This valve is cylindrical in form and receives air under pressure through pipe 173 to the groove or passage 174 in the inside surface of the outer casing of valve 172. Within this outer casing is secured an inner sleeve 175 within which is the longitudinally movable valve proper 176, the outer surface of which is provided with annular grooves 177, 178. The valve 176 is normally held at one end of its stroke by a spring 179 disposed in the hollow of the valve 176 and is moved against the action of this spring by air pressure admitted through pipe 180 upon depression of the LJ key as mentioned above. Normally constant air pressure from pipe 173 enters the passage 174 and passes through the port 181 into the annular space 178 and thence through port 182 into the pipe 183 leading to the driving cylinder 132; also this air under pressure passes from the passage 174 into the pipe 184 which leads to the cylinder for driving the justification drum. When, however, the valve 176 is operated, air from the pipe 183 is exhausted through the port 182, the annular space 178 and the exhaust port 185; air in the pipe 184 is not exhausted but air under pressure enters the reversing cylinder 132' from the pipe 173, the passage 174, the port 181, the annular passage 177 and the port 186 (Fig. 32) into the pipe 187 leading to the reversing cylinder. The pipe 188 leading to the cylinder for releasing the pawl of the justification drum pointer through the motor 171—and also the units wheel pawl 133 through the motor 170, is normally exhausted through port 189 (Fig. 30), the annular passage 190 and the exhaust port 191, but upon actuation of the valve 176 air is admitted to the pawl release cylinder and motor 170 for pawl 133 through the pipe 173, the passage 174, the port 192, the annular passage 190, the port 189 and the pipe 188 leading to the motor 171. The pipe 187 normally is exhausted through the port 186, the annular passage 177 and the exhaust port 193. The annular grooves 177 and 178 on the valve 176 are so located relatively to each other and to the ports opened and closed by the valve, that a very essential timing of operations is thus accomplished. As will be seen in Fig. 29, upon the valve 176 being driven to the right by air controlled by the LJ key, the reversal of air from the drive cylinder to the reverse cylinder is accomplished first, that is, before air is admitted to lift the units wheel pawl out of mesh with the units wheel and on the valve taking up its normal position, the opposite action takes place, that is, the pawl is meshed with the units wheel before air is exhausted from the reverse cylinder and admitted into the drive cylinder. This ensures proper meshing of the pawl while the board is at rest in position for beginning the next line of composition and prevents wear on the teeth of the units wheel and pawl, due to improper position of the parts at the instant of meshing. The vertical shaft 146 previously referred to is provided with a sprocket 200 which turns with the gears 145 and 154, the sprocket being at the upper end of the shaft and being engaged by the endless band or chain 201 extending horizontally to the right of the measuring mechanism to mesh with the sprocket 202 keyed to the vertical shaft 203 on which is secured in any well known manner a cylindrical justification scale or drum 204. A development of this drum is shown in Fig. 45. The sprockets are of the same diameter so that, when the shaft 146 is rotated, the scale 204 is rotated simultaneously and to the same degree. The chain is of an adjustable type to be maintained always tight and to allow of no lost motion. By manipulation of the knurled head 152 when its shaft 152' is horizontal, the scale 204 may be manually rotated through the gear 154.

The justification drum pointer 205 is carried by the rack 206. It is advanced upwardly by the pawl 207, pivoted on the end of the arm 208, the latter being pivoted to the frame of the machine at 209. The arm 208 is forked to provide an extension 210 which is connected by a link 211 to the piston 212 of the motor for operating the rack. A spring 213 maintains the pawl in contact with the rack 206, and a spring 214 maintains the piston 212 in its down or lowermost position except when operated by air under pressure. The retaining pawl 215 controlled by a spring 216 maintains the rack in elevated position after each one-tooth advance by the pawl 207. The tail of the retaining pawl 215 is adapted to be engaged by one arm of the bell crank lever 217 when it is desired to cause the rack to fall to its initial or down position. This bell crank lever 217 is pivoted at 218 and its vertical arm engages the retaining pawl 215 while its horizontal arm is operated through the link 219 by the restoring motor 171. The rack is provided with 18 teeth to correspond to the number of spaces between words in a line of composition. When the 18th tooth is reached a pin 221 carried by the rack engages with the arm 222 in such a manner as to raise this arm and thus cause the valve plunger 223 to be depressed. This valve plunger is normally maintained in closed position by constant air admitted through pipe 224 but when depressed by the lever 222, air is admitted from this constant pressure pipe to pipe 225 (Fig. 49) whence it is distributed in a manner to be hereinafter pointed out. The top end of the pawl 207 is beveled to contact with the beveled surface of the stop 220, these surfaces acting to throw the pawl against the ratchet teeth and also insuring a definite limit of stroke. The restoring to zero position is accomplished, as hereinbefore described by the depression of the LJ key thus causing air to reach the motor 171 through the pipe 188.

Figure 35:
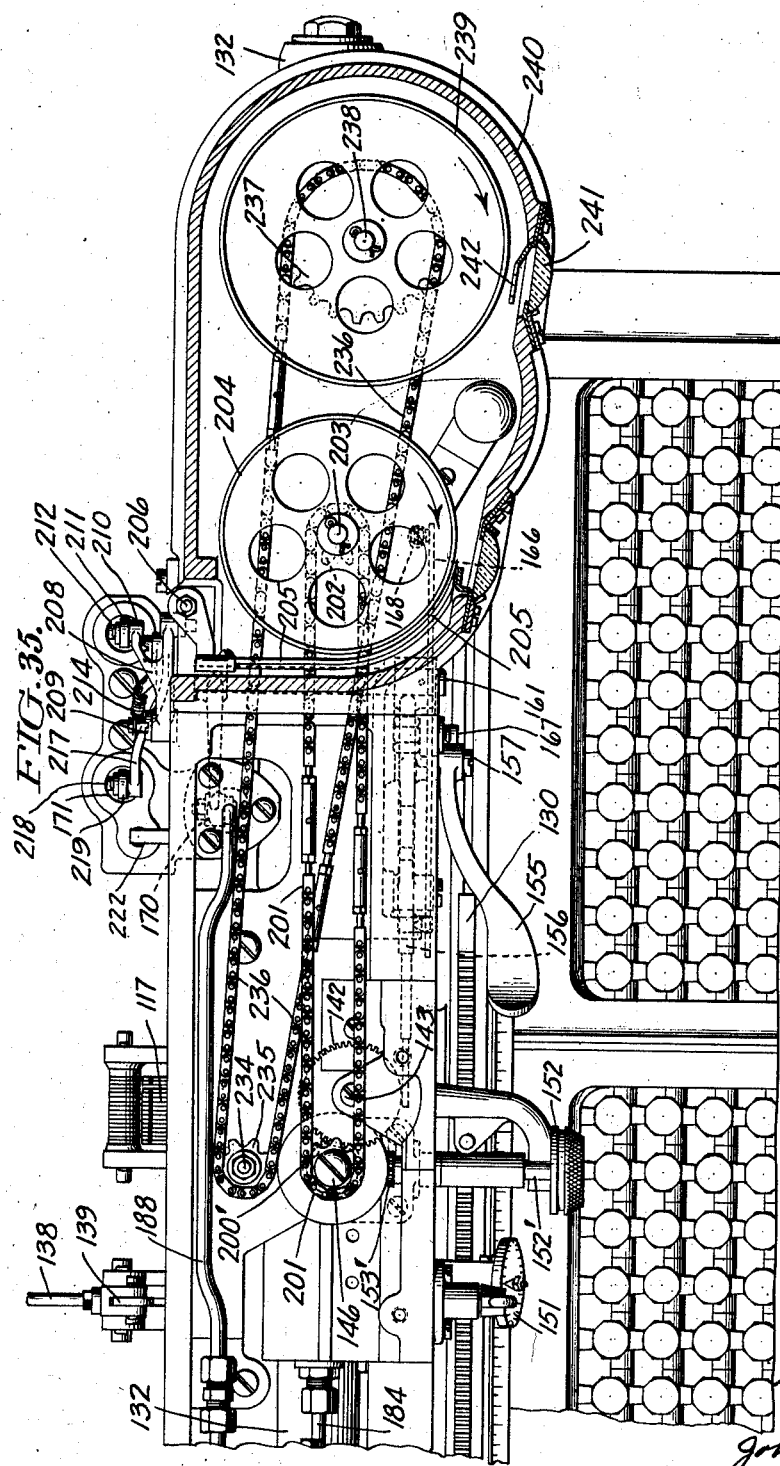
Fig. 35 is a plan view of the keyboard and justification and quadding drums and the driving mechanism therefor, this view being partly in section.

The justification drum 204 is shown in Fig. 45. Justification is in units and 16ths of a unit instead of in fractions of an inch. The drum has 72 vertical columns representing units while the horizontal positions or rows represent justification spaces in a line. Where the columns and rows are provided with indicia in the form of two figures, one above the other. The upper figure represents whole units obtained by dividing the shortage of the line by the number of spaces and the lower figure represents 16ths of a unit left over by such division. Taking one example and referring to Fig. 45, if the shortage is 41 units and the justification space pointer indicates 14 spaces in the line, the indicia is obtained as follows: 41 is divided by 14 giving 2—13/14, the upper figure of the indicia is, therefore 2 and 13/14 of a unit reduced to 16ths or 13/14 multiplied by 16 equals approximately 15. The lower figure is, therefore, 15. Justification is registered by depressing the 2 and 15 justification keys in order, and the scale indicia as well as the controller signal perforations thus represent the justification addition in units and fractions thereof. The scale is universal and need not be changed as heretofore to accommodate different sizes. The keyboard thus considers nothing but units and fractions thereof. The units wheel driving rack 130' (Fig. 24) previously referred to, is in the present construction provided with side rack teeth 232 meshed with the gear 233 on vertical shaft 234 having suitable bearings in the machine frame and provided at its upper end with a sprocket 235 on which is meshed a sprocket chain 236. This sprocket chain is similar to the chain 201 previously described, extends horizontally and parallel with the chain 201 and is meshed with sprocket 237 (Fig. 22) keyed to shaft 238, the latter being parallel to the justification scale shaft 203 and slightly to the right thereof for the accommodation of the quadding scale 239. This scale is cylindrical in form and is housed in a casing 240, which also houses the justification drum, provided with a vertical, magnifying window glass 241, through which the exposed vertical column of the scale may be seen as well as the stationary horizontal row indicator 242 (Fig. 35). A development of this quadding scale 239 and of the pointer or indicator 242 is shown in Fig. 44. The scale has 90 vertical columns representing ems and corresponding to the 90 ems of em scale shown in Fig. 36. There are eighteen horizontal rows representing units of measurement and the relationship of the gears 237, 235 and 233 is such that when the rack 130' moves 18 units as shown by the em scale pointer as well as by the dial 151, the quadding scale is moved one column. With each key struck affecting the measuring mechanism therefor, the em scale pointer, the dial pointer and the quadding scale are operated. The column of the quadding scale exposed represents the line shortage in ems while the dial pointer shows the additional shortage in units.

Figure 36:
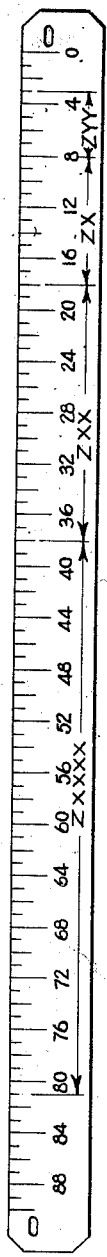
Fig. 36 shows the line scale.

Special keys, Z, X, Y are provided for use in connection with the scale 239. Z produces the signal which multiplies by two the value of the signals of the X or Y keys struck. Y represents one em; YY would mean two ems; ZYY would mean four ems. X represents four ems. ZXXXX would produce a controller signal for thirty-two ems. These signals when received by the casting machine have the effect of producing revolutions and casting operations in accordance with the ems represented and the Z signal has a function of signalling the casting machine to produce double the number of revolutions and casts represented by the X or Y keys struck. The em scale shown in Fig. 36 is provided with zones, the ZYY or four em zone extending from four to eight ems on the scale, the ZX or eight em zone extending from eight to eighteen ems on the scale, the ZXX or sixteen em zone extending from eighteen to thirty-eight ems and the ZXXXX or thirty-two em zone extending from thirty-eight to eighty-one ems on the scale. These zones are shown on the scale 239 (Fig. 44) and are also designated at the bottom of the em scale shown in Fig. 36 in a manner which will be well understood. It may be pointed out that the zones are moved over one em on the quadding scale as compared with their position on the em scale for the simple reason that the Z signal is always used in connection with this scale and the keyboard counts one em for this signal, while in fact there is no casting of a type body of one em set width to correspond with the one em measurement on the keyboard for the Z signal.

On account of the multiple values of the Z, X and Y signals it is possible to quad out a line by operating only a few keys. This makes for high speed of operation. If in the line of composition the em scale pointer is at 57 and the dial pointer at 0 at the top of the dial, the shortage of the line to be filled with justification spaces or quads is 58 ems, counting the em introduced by the Z key. The operator observes the justification indicia and then presses the multiple value keys shown in the zone in which the em scale pointer is located, in this case in the ZXXXX zone. In such way he takes care of twice four times four ems or thirty-two ems. The indicia at the bottom of column 58 of the quadding scale represents a justification key produced signal for taking care of the remainder of the shortage. This indicia is obtained as follows: The shortage is 58 and the ZXXXX signals take care of 32 ems, these being represented by bodies of spaces to which justification is to be added, so that the justification to be accounted for is 58 minus 32 or 26 ems; since there are 18 units in each em, the 26 ems are reduced to units by multiplying 26 × 18 which equals 468 units. Since these 468 units are to be divided among 32 bodies, 468 is divided by 32 giving as a quotient 14 with 20/32 as a remainder which is 10/16. 14 is the top figure of the indicia and represents 14 units while 10 is the bottom figure of the indicia, representing 10/16 of a unit. The justification is therefore 14—10.

These indicia in all cases represent the shortage per space in units and 16ths of units, which has been obtained by dividing the total shortage by the number of justified bodies in the line; in zone ZXXXX these justified bodies are 32, in zone ZXX they are 16; in zone ZX they are 8 and in zone ZYY there are 4 spaces to be justified. The upper figure of the indicia represents units and the lower figure of the indicia represents 16ths of units and together they represent the shortage to be added to each one of the justified bodies to cause a line to be completely filled. The Z, X and Y keys may be for plain justified low space bodies while other Z, X and Y keys may be associated with leader lines and others are for high spaces. These special keys are conveniently located in the small bank of keys at the left of the two main banks (Fig. 1) ZS, or Z coupled with a justifying space, is shown in Fig. 49, and it will be seen that it operates the 18 unit punch, the Z punch and the JS punch. The other Z keys are not deemed necessary to illustrate more particularly; they are designed to produce the necessary perforations in the record strip and each produces a measurement of one em on the measuring mechanism.

If the dial pointer indicates any one of the units 8, 7, 6, 5, 4, 3, 2, 1 on the right of the dial, the upper part of the quadding drum pointer 242 is used and if the dial pointer indicates any one of the units 9, 8, 7, 6, 5, 4, 3, 2, 1, 0 on the left side of the dial, the corresponding number on the lower part of the counter or pointer 242 is used. The dial pointer operates in a clockwise direction.

To take another example, if the em scale pointer is at 57 ems and the dial pointer at four units in the right hand segment of the dial, these four units are found by the operator in the upper half of the pointer 242 at the row indicated by the number 4. Counting from the bottom row this number 4 represents 13 units. Since the shortage is 57 ems and one em must be added on account of the Z signal, the shortage indicated on the quadding scale is 58 which is 57 on the em scale plus 1. 58 minus 32 equals 26 ems remaining. 26 × 18 equals 468, plus 13 equals 481, which divided by 32 equals 15 with 1/32 over. This small amount is not counted so that the justification reading would be 15—0. Thus the reading of indicia at the intersection of column 58 on the scale 239 with the row 4 near the top of the pointer 242 will be found to be 15—0.

It is clear that the operator does not do any calculating; he merely observes the justification signal such as 15—0 and strikes the corresponding justification keys after he has struck the Z key followed by the X key repeated to produce four X signals. Since the Z key has the meaning of multiplying by 2, the bodies cast from the signals produced by the X and Y keys, these multiple value keys and the quadding scale 239 may be used for centering composition in a line equally between the ends thereof. The Z signal is first produced after which the composition to be centered is written. Then the justification is noted on the quadding scale, then the proper X keys or Y keys are struck in accordance with the zone in which the justification indicia are located and then the justification keys indicated are struck together with the JS and GT keys to restore and signal the galley trip of the caster.

Certain of the keys and their operative connections are shown schematically in Fig. 49 and some of them such as LJ and GT have already been described. The key $i$ is representative of a character key. Its depression, it will be seen, causes air to traverse punch operating pipe 5 representing 5 units; it also brings air to punch pipes FB½, FB1 and RL1, being signals for matrix case positions in the caster. Key 1 when depressed, causes air to traverse punch pipe 9, FB½ and RL2. The space key JS operates valve ban which cause air to be conducted to certain of the transfer blocks 250, 251 and 252 shown in diagrammatical fashion in Fig. 49. The depression of the JS key causes operation of valve bar 253 which in turn leads air through pipe 254 to the block 251 where it is shut off normally by the cylinder valve 255. Valve bar 256 is also operated to cause air to traverse pipe 257 to the control block 250 where it passes through the central groove of the valve 258 to the central groove of valve 259 thence out through pipe 260 to the motor 211 driving the justification scale pointer up one space. At the valve 259, part of the air passes to one end of the control pellet 261 and thus admits air to pipe 262 leading to the JS punch pipe. Valve bar 263 is also operated to cause air to traverse pipe 264 leading to the control block 252 where it normally passes through the upper groove of the valve 265 and then to one end of the pellet 266, moving the latter to expose a port leading to pipe 267 and the 4-unit punch pipe. Thus the JS key operates the JS and 4-unit punches. When 18 spaces have been composed in a line, the rack 206 will have reached its highest position, and the pin 221 will operate the lever 222 which in turn will operate the plunger 223 to allow air under constant pressure in pipe 224 to enter pipe 225 leading through pipe 268 to the control block 252 at a point below the valve 265, thus driving the latter to its up position. In this position, air from pipe 264 is cut off from the upper groove of the valve and consequently from pipe 267, but in this position the valve air enters the lower groove whence it travels below the pellet 269 driving it up and exposing a port leading to pipe 270 and the 6-unit punch pipe. After 18 spaces, therefore, the 4-unit punch is cut off and the 6-unit punch is operated.

The 4-unit punch is operated from a 4-unit character key *i'* through the valve bar 271 and pipe 272 which leads air below the pellet 266 in the control block 252 and drives the pellet oppositely to the direction driven by the JS key operation to expose a port leading to the pipe 267 and the 4-unit punch pipe.

The 6-unit punch is operated from a 6-unit character key by a valve bar operative plunger 272' thus causing air to traverse pipe 272" leading to the top of the pellet 269 in control block 252 and driving the pellet to expose a port leading to pipe 270 and the 6-unit punch pipe.

It has previously been stated that the ZS key operates the 18-unit punch, the Z punch and the JS punch. Tracing this out on Fig. 49 the ZS key operates a bar 273, one lug of which causes operation of valve bar 274 which latter operates a plunger valve to admit air to pipe 275 connecting with the punch pipe 18; another lug causes operation of valve bar 256 and, as previously described, air traverses pipe 257, valve 258, valve 259, operates pellet 261 and traverses pipe 262 leading to punch pipe JS; also air enters pipe 260 causing the rack 206 to advance one tooth; another lug operates valve bar 276 to open a plunger valve and admit air to the punch pipe Z. Valve bar 277 is advanced as is also valve bar 278 whenever the punch driving engine is actuated and signals are produced. The plunger operated by bar 277 admits air into pipe 279 leading to control block 251 where it is normally blocked by the valve 280. The ZS key is in the side group of keys and in addition to the lugs of its bar 273 for producing the operation of the JS, 18-unit and Z punches, the valve bar has a lug 273' (Fig. 40) which engages a lever 281 through the intermediary of a slide 282. This lever 281 is centrally pivoted at 283 and as the slide 282 moves its upper end, the lower end engages the plunger 284 of usual construction and causes air to traverse pipe 285 leading above the valve 280 to move it against its spring to bring the reduced portion 286 thereof to expose pipe 279 already containing air under pressure and thus causing such air to traverse passage 287 leading to one end of pellet 288 whence air is led into pipe 289 and through it to punch pipe LQ. The ZS key, therefore, produces the Z, JS, 18-unit and LQ or low quad signals.

Alongside of the lever 281 and pivoted on the shaft 283 are levers 290 and 291, the upper ends of which are longer than that of the lever 281 and are in position to be engaged by keybars in the side section of the keyboard. The upper extremities of these levers 290 and 291 are laterally extended at 292 so as to be engaged by any one of a plurality of bars arranged side by side. The bar 273 as well as those other bars adapted to engage the slide 282 are shorter than the bars for engaging the levers 290 and 291. All three levers are carried on the pivot 283 which is in the form of a shaft supported in the block 293 suitably secured to the keyboard frame. The lower ends of the levers engage the ends of the plungers, lever 281 engaging plunger 284 and levers 290 and 291 engaging plungers 294 and 295 respectively. These plungers are of well-known construction; and when operated by the levers, cause air under pressure in a chamber 296 to pass through outlet pipes and when closed to exhaust such pipes. The slide 282 extends from the upper end of lever 281 toward the side section bars and is laterally extended at its end near the bars so as to be engageable by one or more of several bars arranged side by side.

The ZS key in the side section of keys has been described as to its pneumatic connections and operative results and in Fig. 49 are also shown as examples in this side section the low character key LC, the low space key LS and the letter space key 2LS.

The key LC moves a bar which operates upon the slide 282 and the lever 281 to admit air to pipe 285 leading to one end of the valve 280 in the control block 251. Since at every impulse of the engine, the valve bar 277 is actuated allowing air to traverse pipe 279 leading to control block 251, when the valve 280 is operated by depression of the LC key, air is admitted from pipe 279 to the reduced portion 286 of the valve and is thus caused, as previously described, to enter the punch pipe LQ. Thus it is possible to strike the character key simultaneously with the LC key and produce a signal which represents a low quad of the set size of the character struck.

The low space key LS operates a bar which engages the upper end of lever 291 causing it to operate its associated plunger valve 295 and causing air to traverse pipe 297 leading to one end of valve 255 in control block 251. The key LS is constructed so that it will remain in depressed position if desired, and, as will be seen, no signal results if it is used alone or with a character key. If a space key is depressed simultaneously with the LS key, this causes air to pass through pipe 254 to the valve 255 which upon being raised by the LS key operation will permit air to pass through the groove portion of the valve to one end of the pellet 288, that is, the opposite end to that to which the passage 287 leads, to move the pellet and to allow air to traverse pipe 289 and thus reach the LQ punch pipe to obtain a low space. Therefore, the LS key must be struck simultaneously with the space key or may be anchored in down position in order to make all of the spaces low spaces.

The 2LS key representing letter spacing in which a definite number of units, say 2, are added to characters, operates lever 290 and plunger 294 thus opening air pressure to pipe 298 leading to the motor 299 (Fig. 22). The piston of this motor is extended in the form of a rod 300, the end of which is secured to the cradle 301 which is slidable horizontally on the block 302 secured to the keyboard frame below the units wheel 131. The rod 300 is adjustable in length in any suitable manner and the cradle is of a length to carry the associated stops 119. When the units rack is driven by the units wheel, it strikes against a raised stop and since the stops are capable of a certain amount of side motion, the struck stop compacts all of the other stops to its right and the last stop finally comes against the shoulder or abutment 303 on the cradle 301. This shoulder comes against the plunger 304 inserted in an aperture in the block 302 and the motion is restricted by the coil spring 305. This spring surrounds the plunger 304 and is carried in a cylindrical extension of the block 302. At the end of the spring there is provided a screw 306 threaded into this extension in such a manner that it can be adjusted to regulate the force of the spring. The screw threaded rod 307 is carried by the cradle and a shoulder 308 on the rod 307 is adapted to come into contact with a lug 309 on the block 302 when the motor 299 has been operated and has moved the cradle against the action of the spring 305, so that any stop which has been raised will cause two units more to be added than would normally be the case. The normal stop for the cradle is formed by the nut 310 located on the rod 307 and coming against the block 302 due to the force of the spring 305 when there is no air pressure in the motor 299. This normal position of the cradle can easily be regulated by the nut 310 so that the measurement of the units wheel will be accurate. When the motor 299 is operated, the rod 300, the cradle 301 and its shoulder 303 will obviously have been moved a distance of two units which is regulated by the position of the stop 308 with respect to the shoulder 309. When a character key is struck and the 2LS key is also struck the measurement for the character will, therefore, be two units more than normal. The bar operated by the 2LS punch is also provided with a lug which operates a rocker arm, the latter operating the valve bar 311 and through the operation of the associated plunger valve causing air to be admitted through pipe 312 to one end of the valve 259 in the control block 250. This operates the valve 259 to prevent air from traversing pipe 260 and leading to the motor 211 for advancing the justification scale pointer. At the same time since the valve bar 278 is operated with every impulse of the motor, air is admitted by the operation of the corresponding plunger to pipe 313 leading to the control block 250 and normally being cut off from further action by the position of the valve 259. However, when the valve 259 is raised by the depression of the 2LS key, air from pipe 313 traverses the reduced portion 314 of the valve 259 so as to enter pipe 315 leading to punch pipe 2LS thus producing a signal by which the caster is controlled to cast a character with two units in addition to the character size also signalled.

The shift key SH is also shown in Fig. 49 which causes the operation of valve bar 316 to admit air to punch pipe RL½. The delete key D operates valve bar 311 and causes air to be admitted to pipe 312 leading to one end of the valve 259 in control block 250; also through valve bar 256 air is admitted to pipe 257 and passing valve 258 passes around the lower reduced portion of valve 259 which is now raised, and this causes air to be admitted to the upper end of pellet 261 and through pipe 262 to the JS punch pipe. The key D is not used alone and when a character key is depressed simultaneously with the depression of the D key, the engine is caused to operate and air is admitted by the actuation of valve bar 278 through pipe 313 and through the upper reduced portion 314 of the raised valve 259 to pipe 315 and finally to the 2LS punch pipe. Since the valve 259 is raised, no air is admitted through pipe 260 to the motor 211 for driving the justification pointer, but the JS punch is nevertheless operated. If the D key is used after 18 spaces have been composed in a line, air entering pipe 225 and branching to pipe 225' raises the valve 258 in control block 250 so that communication from pipe 257 through the central reduced portion of the valve 258 now raised, passes through the passage 317 to the lower reduced portion of the raised valve 259 and thence to the upper end of pellet 261 and through pipe 262 to the JS punch pipe. The result of this construction is that the JS punch is operated by the D key even though 18 spaces or more have been introduced into the line of composition.

Correction key C operates a valve bar which is provided with lugs to duplicate operation produced by the depression of the D key and in addition it has a lug which operates valve bar 318 which through its corresponding plunger causes air to flow to the punch pipe X. Therefore, the correction key operates a punch X in addition to the JS and 2LS punches operated by the D key. In addition to these punches, character key punches are also operated since the C key is used only in conjunction with the operation of a character key.

In Figs. 37, 38 and 39 particularly, the punch operating bars 40 are shown which are moved upwardly by the motors 38 and are connected to the punch levers 43 for operating the punches 44. The 4-unit bar 440 is provided with a laterally extending pin 319 which co-operates with a cam slot 320 located in an extension 321 of the 6-unit bar 640. This extension 321 of the bar 640 extends laterally toward the 5-unit bar so that the cam slot therein is in position to be engaged by the pin 319. The cam slot structure is pivoted to the bar 640 at 322 so that as the 4-unit bar is operated, the pin 319 thereof co-operates with the cam slot 320 to move the extension 321 a slight amount rearwardly on its pivot 322. The arrangement is shown clearly in Fig. 39 and attention is called to Fig. 16. Each time the 4-unit bar is operated, the extension 321 is moved rearwardly so that its shoulder 323 will be positioned under the stop 324 on the guide frame for the bars 40. In this way each time the 4-unit bar is operated the 6-unit bar is locked against operation. However, when the 6-unit bar is operated it will move upwardly in its guides without any swinging movement of the extension 321. The provision of the pin and cam arrangement is important when 18 spaces have been composed in a line and the justification pointer bar 206 operates upon the lever 222 to permit air under pressure to enter below the valve 265 in the control block 252. This action, as has already been explained, causes air after the 18th justification space to operate the 6-unit punch. At this transition point between the operation of the 4-unit punch and the 6-unit punch there is a possibility of air entering the motors for both punches in which case air operating the bar 440 will swing the extension 321 to lock the 6-unit bar 640 against operation. Thus, with the possibility of air under pressure operating both bars, only the bar 440 will be operated. When the 19th justification space is reached the valve in control block 252 will have had plenty of time to have reached its raised position and therefore air under pressure will be admitted only to the motor for the 6-unit bar and it alone will be operated.

As a necessary part of the keyboard construction, there is provided a copy holder in which the matter to be composed is inserted in the form usually of typewritten or printed sheets. This copy holder is located directly in front of the operator at the approximate level of the operator's eyes and is provided with a handle, by turning which the copy may be advanced for reading exposure. The copy holder shown is indicated by the character 400 and it is to be noted that its location is on a level with the justification drum and quadding drum so that the operator's eyes may readily turn from copy holder to the insignia on the drum with which he is at the moment concerned. The keyboard frame is provided with a horizontal shelf 401 on which the base 402 for the copy holder is located. A pivotal pin 403 extends vertically through the base 401 and also through a base plate 404 in such a way that the plate may swing on pivot 403 which is at the rear of the copy holder, and it will be seen that the operator may swing the holder to any angle which will make his reading of the copy the most convenient. The plate 404 is provided with a tongue 405 and the base 402 of the copy holder is provided with a space running from front to back for the accommodation of this tongue. The tongue has overhung shoulders at the sides and the base 402 is provided with shoulders which co-operate with these overhung portions of the tongue so that the base is held upon the machine, but is capable of being slid on the tongue in a front and back direction. The operator may therefore swing the holder on the pivot 403 and also may draw the holder toward him or push it away from him along the slides formed at either side of the tongue 405. Above the base the holder is formed into two cylindrical receptacles; the front cylinder being adapted to receive the copy in rolled formation and the rear cylinder being adapted to receive it after it has passed before the eyes of the operator. These cylinders are parallel to each other, and extend in substantially the same horizontal plane and the front cylinder 406 may be in the form of a casting secured to the base by the screws 407 and the rear cylinder 408 being integral with the base and having a forwardly and upwardly extending wall 409, these constructions being particularly shown in Fig. 47. The ends of both cylinders are open and therefore a roll copy of considerable length may be inserted into the front cylinder and discharged into the rear cylinder. The front cylinder is provided with a cut away portion or gap and a reading plate 410 is secured to the top wall of the cylinder, the lower end of the plate extending within the cylindrical space formed by the interior walls of the part 406. This plate 410 may be longer than the length of the cylinder 406 for the accommodation of copy which is of greater length than the length of the cylinder. The plate 410 at the front end slants upwardly and rearwardly so that the copy in front of the plate can be very readily observed by the operator and is then curved to the rear so that the rear end of the plate extends downwardly and rearwardly in the form of a guiding wall 411. The paper upon being discharged into the cylinder 408 will extend between the walls 409 and 411 and to assist in curving it toward the discharge cylinder there is provided a plate 412 which is secured to the wall 409 and runs forwardly at first parallel with the walls 409 and 411 and then curves downwardly to a point very close to the upper part of the plate 410. A space is, however, provided between the guiding wall 412 and the plate 410 for the accommodation of the paper to be fed from the front cylinder to the back cylinder. The plate 410 at its point of curvature to form the wall 411 is cut away to provide apertures 413, of which five are shown in Fig. 46. Extending through these apertures are rollers 414, their peripheries extending slightly beyond the plate 410 so as to co-operate with rollers 415, hereinafter to be described, for the feeding of copy toward the discharge cylinder. The rollers 414 are carried on a shaft 416, the ends of which form conical bearings in the ends of suitable screws 417 carried by the side plates of the holder. It will be obvious that by manipulating the screws 417, the shaft 416 and the rollers 417 thereon may be adjusted longitudinally of the shaft to very accurate location with respect to the perforations 413. The rollers 414 are secured to the shaft 416 by pins 419 or by any other suitable means. The front cylindrical casting 406 is provided with a horizontal boss or bearing 420 just above the base 402 of the holder. Through this boss extends the shaft 421 and a bevel gear 422 is provided at its rear end. The front end of the shaft 421 is provided with a knurled finger wheel 423. Another boss 424 is provided in the casting for the cylinder 406, and this boss is vertical and is located between and is a part of the web between the cylinders 406 and 408. Within the boss 424 is a shaft 425 provided at its lower end with a bevel gear 426 meshing with the bevel gear 422 previously mentioned. At the upper end of the shaft 425 a worm gear 427 is provided. The casting 406 is also provided with a bearing 428 which is rearward of the plate 410 and extends downwardly in a direction substantially parallel with the plate 411 and the guiding wall 409 of the rear cylinder. Within this bearing is located shaft 429, the lower end of which is provided with a worm 430 in position to properly mesh with the worm 427 and at the upper and forward end of the shaft 429 is located a bevel gear 431, the latter meshing with the bevel gear 432 located on the shaft 416 and near the right-hand aperture 413. When the operator turns the knurled knob 423 the shaft 416 will obviously be operated. When the turning of the knob is to the right, the operation of the shaft 416 and the rollers 414 will be in the direction of the arrows shown in Fig. 47; that is the direction for feeding the copy upwardly across the plate 410 and into the discharge chute. The upper and forward end of the casting wall 409 is provided with a series of spring plates 433, there being as many of these plates as there are rollers 414 and the curved portion of the wall 412 is provided with apertures 434 opposite the apertures 413. Each of the spring plates 433 is provided at its lower end with the roller 415 previously referred to, each roller being on a shaft which has bearings in the plate 433 preferably by bending the latter around the shaft ends and allowing the roller 415 to extend through the window 434 so as to contact with the associated roller 414. The plates 433 are so formed and mounted by the screws 435 that they cause the rollers 415 to exert a slight pressure against the rollers 414. These rollers may be of rubber or other suitable soft material so as to grasp hold of the paper copy to be fed between the group of rollers 414 and their co-operating group of rollers 415. Located above the reading plate 410 and extending the full width of the holder 400 is provided an electric light attachment which is secured at each end in brackets 436 secured to the end walls of the holder. Cylindrical bearings are provided in the brackets for the accommodation of the corresponding ends of a hood 437 so that the latter may be swung on them as a pivot to properly direct light from the electric lamp (not shown) suitably carried between the bearings. The hood 437 is semi-cylindrical in shape and may be provided internally with a reflecting surface. The screws 438 in the split end walls 439 of the hood structure may be adjusted as will be obvious in order to determine the ease with which the hood may be adjusted and also the degree of friction which is necessary to retain the hood in adjusted position.

The forward cylinder casting 406 is provided with an aperture 441 in the center of its forward wall, and within the cylinder is provided a sleeve 442 which is cylindrical and of a length corresponding to the length of the cylinder 406. A portion of the sleeve 442 is bent outwardly so as to protrude through the aperture 441 to form a handle 443. The cylindrical sleeve 442 is slotted lengthwise to allow the extension of the plate 410 into the field defined by the internal diameter of the cylinder 406 and in this way there is formed as a part of the sleeve 442 a forward edge 444 which may be caused to disappear below the forward portion of the casting 406 by pulling the handle 443 downwardly to the bottom of the slot 441 or, by pulling upwardly on the handle 443, the edge 44 may be brought into contact with the front face of the plate 410. The handle 443 may be depressed to throw the sleeve 442 and particularly its forward edge 444 out of action whenever copy in the form of a roll of paper is being used. When, however, a relatively small piece of paper such as a small newspaper clipping is used for copy, it may be placed upon the plate 410 and the handle 443 drawn upwardly so as to cause the edge 444 to grasp the clipping or other bit of copy between the edge 444 and the front face of plate 410. The holder is therefore capable of handling large rolls of copy of considerable length and is just as capable of handling small pieces of copy by the use of the sleeve 442 just mentioned. The feeding of the copy by action of the rollers is done without any difficulty, or any appreciable lost motion, on account of the arrangement of gears used, and it is also accomplished by the operator in a ready manner, the knurled knob 423 being immediately before the operator and capable of being easily manipulated either by the right or the left hand. The provision of the adjustable hood for the electric light enables the operator to move it into the position which will give the best results under the circumstances and when so moved the hood will automatically remain in the position selected.

I claim:

1. A keyboard composing machine comprising keys, valve bars, selective means for advancing the valve bars coresponding to the keys struck, a single stroke motor comprising a cylinder provided with suitable inlet and exhaust ports and a piston therein, a valve for controlling admission of air under pressure to said cylinder, a second valve for controlling the exhaust of air therefrom, means connected with a key for moving said valves in position to operate the motor, a spring for returning said valves to normal, exhaust position when the key is released, said valves being each independently adjustable to attain a fine regulation for the admission and exhaust of air necessary to high speed operation, a plunger valve for each valve bar, means for operating by the motor the plunger valves corresponding to each advanced valve bar, means for producing signal perforations in a record strip for each operated plunger valve and means for operating the motor when a key is struck.

2. A keyboard composing machine comprising keys and punches and connecting instrumentalities through which for each key struck, location and set size signals are produced by the punches in the form of perforations in a record strip, such instrumentalities including a motor mechanism comprising a cylinder with suitable inlet and exhaust ports, a piston therein and duplicate slide valves, one for admitting air into the cylinder and the other for exhausting air therefrom, means for moving said valves simultaneously when a key is struck to admit air to the cylinder, means for returning the valves to normal, exhaust position when the key is released, each of said valves comprising a fixed sleeve portion with separated passages, one connecting with the inlet port of the cylinder and the other, in the case of the admission valve, connecting with a source of air under pressure and, in case of the exhaust valve with the exhause port of the cylinder, said valves also comprising a stem portion slidable in the sleeve portion and provided with a central groove of a length to establish communication between said passages of the sleeve, said valves also comprising an operating rod portion screw threaded to said stem, the latter being thus micrometrically adjustable with reference to the said passages to produce smooth high speed operation of the motor without chatter and double firing.

3. A keyboard composing machine comprising keys, valve bars selectively advanced by the depression of keys, a tappet pivoted to the forward end of each valve bar, a single stroke motor provided with starting means, a lever driven by the motor to contact with and operate the valve bar tappets, plunger valves in position to be operated by the tappets of the advanced valve bars and means connecting a key with the motor starting means to actuate the motor when a key is struck.

4. A keyboard composing machine comprising keys, punches, connecting means for selectively operating the punches in accordance with the key struck and thus producing signals in the form of perforations in a record strip, means for supporting a roll of paper constituting the record strip, including a roller journaled in the frame of the machine for supporting the paper roll, the latter resting by its periphery on the roller, a punch die cylinder around which the strip is adapted to be threaded, a spring actuated tension bar pressing the strip against the periphery of the roll at the point where the strip leaves the roll and extends toward the punch die cylinder, a displaceable tension plate for retaining the strip in contact with the punch die cylinder, a rewind device and means for operating the latter intermittently at each key stroke for drawing the strip from the punch die cylinder to the rewind device.

5. A keyboard composing machine comprising keys, punches, connecting means for selectively operating the punches in accordance with the keys struck and thus producing signals in the form of perforations in a paper record strip, a punch die cylinder, a strip feed shaft co-axially with and extending through the said cylinder, separated bearings in the frame of the machine for supporting the shaft, said bearings being located beyond one end of the cylinder whereby the other end of the shaft extends through and projects beyond the other end of the cylinder, separated feed wheels secured to the shaft at each end of the cylinder, means including a ratchet mechanism located between the bearings for rotating the shaft step by step when keys are struck, a sleeve secured to the shaft within the cylinder and provided with vanes for propelling paper nibs or punches within the cylinder toward and beyond the end of the shaft farthest from the bearings, a catch receptacle secured to the frame of the machine and provided with a discharge spout to receive these punchings and deliver them by gravity to a point below the punch cylinder.

6. A keyboard composing machine comprising keys, punches, connecting means for selectively operating the punches in accordance with the keys struck and thus producing signals in the form of perforations in a record strip, means for supporting a roll of paper constituting the record strip, a punch die cylinder and a rewind spool in line with the travel of the strip from the roll, around the cylinder and to the rewind spool, parallel shafts, one for the rewind spool and the other located axially within the punch die cylinder for feeding the strip and propelling punchings from the cylinder, a pair of separated bearings in the frame of the machine for each shaft, said bearings being located beyond one end of the rewind spool and of the cylinder, whereby the other end of the rewind shaft is unobstructed for the application and removal of the strip from the spool and the corresponding end of the feed shaft is unobstructed for the discharge of punchings, means for operating the feed shaft intermittently at each key struck, said means being located between the bearings of said shaft and means for operating the rewind shaft from said feed shaft operating means, said rewind shaft operating means being located between the bearings of said rewind shaft.

7. A keyboard composing machine of the kind in which a paper controller strip is perforated by punches under the control of keys and comprising means for supporting a roll of paper, a punch die cylinder and a rewind device, the paper being led from the roll around the cylinder to the rewind device, dies for the punches supported by said cylinder, punches and punch guides in position to cause each punch to co-operate with its die in the cylinder, a space being provided between the dies and the punch guides for threading the paper strip thereinbetween, a tension plate pivoted to the frame of the machine and having a contour to correspond with the curvature of the cylinder, said tension plate being provided with a recess, a roller carried by the plate in said recess and spring pressed to a position extending slightly beyond the contour surface of the plate, spring means for normally pressing said roller against the strip to hold it frictionally against the cylinder and means for manually removing said plate from normal position to non-operating position in which a space is provided between the plate and the cylinder of sufficient size that the threading of the strip around the cylinder is unobstructed and thereby facilitated.

8. A keyboard composing machine of the kind in which a paper controller strip is perforated by punches under the control of keys and comprising means for supporting a roll of paper, a punch die cylinder and a rewind device, the paper being led from the roll around the cylinder to the rewind device, dies for the punches supported by said cylinder, punches and punch guides therefor in position to cause each punch to co-operate with its die in the cylinder, a space being provided between the dies and the punch guides for threading the paper strip thereinbetween, a filler plate normally positioned between the punch guides and the dies for substantially filling said space, but allowing a sufficient channel between the plate and the dies for the free operative feeding of the strip and means for manually removing the plate from normal position to non-operating position in which the total space between the punch guides and dies is unobstructed to facilitate the threading of the strip thereinbetween.

9. A keyboard composing machine of the kind in which a paper controller strip is perforated by punches under the control of keys and comprising means for supporting a roll of paper, a punch die cylinder and a rewind device, the paper being led from the roll around the cylinder to the rewind device, dies for the punches supported by said cylinder, punches and punch guides therefor in position to cause each punch to co-operate with its die in the cylinder, a space being provided between the dies and the punch guides for threading the paper strip thereinbetween, a filler plate normally positioned between the punch guides and the dies, said plate having a comb edge portion, the teeth thereof extending between the operating paths of the punches and the spaces between the teeth permitting of the operation of the punches therein, said plate substantially filling the space between the punch guides and the dies, but allowing a sufficient channel between the plate and the dies for the free operative feeding of the strip, said comb edge maintaining the strip in said channel in close proximity to the dies during both the punching and withdrawal operations of the punches and means for manually removing the plate from normal position to non-operating position in which the total space between the punch guides and dies is unobstructed to facilitate the threading of the strip thereinbetween.

10. A keyboard composing machine of the kind in which a paper controller strip is perforated by punches under the control of keys and comprising means for supporting a roll of paper, a punch die cylinder and a rewind device, the paper being led from the roll around the cylinder to the rewind device, dies for the punches supported by said cylinder, punches and punch guides therefor in position to cause each punch to co-operate with its die in the cylinder, a space being provided between the dies and the punch guides for threading the paper strip thereinbetween, a tension plate pivoted to the frame of the machine and normally spring pressed toward the cylinder to frictionally hold the strip against the cylinder, a filler plate pivoted to said tension plate and normally positioned between the punch guides and the dies for substantially filling said space between them but allowing a sufficient channel for the free operative feeding of the strip, means for manually removing said tension plate and filler plate from normal position to non-operating position in which a space is provided between the tension plate and the cylinder and between the punch guides and the dies for facilitating the threading of the strip around the die punch cylinder.

11. A keyboard composing machine of the kind in which a paper controller strip is perforated by punches under the control of keys and comprising means for supporting a roll of paper, a punch die cylinder and a rewind device, the paper being led from the roll around the cylinder to the rewind device, dies for the punches supported by said cylinder, punches and punch guides therefor in position to cause each punch to co-operate with its die in the cylinder, a space being provided between the dies and the punch guides for threading the paper strip thereinbetween, a tension plate pivoted to the frame of the machine and normally spring pressed toward the cylinder to frictionally hold the strip against the cylinder, a filler plate pivoted to said tension plate and normally positioned between the punch guides and the dies for substantially filling the space between them but allowing a sufficient channel for the free operative feeding of the strip, said filler plate having a comb edge portion, the teeth thereof extending between the operating paths of the punches and the spaces between the teeth permitting of the operation of the punches therein, said comb edge maintaining the strip in the said channel, during both the punchings and withdrawal of the punches from the dies, means for manually removing said tension plate and filler plate from normal position to non-operating position in which a space is provided between the tension plate and the cylinder and between the punch guides and the dies for facilitating the threading of the strip around the punch die cylinder.

12. A keyboard composing machine comprising keys, valve bars, selective means including rocker arms for advancing the valve bars corresponding to the depressed keys, a motor provided with starting means, tappets on said valve bars and means for operating the tappets by the motor, plunger valves located with reference to their corresponding tappets so as to be operated thereby when the latter and their valve bars are in advanced position, means for producing signal perforations in a record strip for an operated valve, means connecting certain keys with the motor starting means, certain other keys being free of connection with said starting means, whereby upon depression of both said last mentioned non-starting keys and said first mentioned starting keys, combination signals are produced and the functions of the non-starting keys are performed only in connection with those of the starting keys.

13. A keyboard composing machine comprising keys including a justification space key and a justification key, valve bars, selective means including rocker arms for advancing the valve bars corresponding to the depressed keys, a motor provided with starting means, tappets on said valve bars and means for operating the tappets by the motor, plunger valves located with reference to their corresponding tappets so as to be operated thereby when the latter and their valve bars are in advanced position, means for producing signal perforations in a record strip for an operated valve, means connecting the justification key with the motor starting means, the line justifying key being free of connection with said starting means, whereby the depression of the justification space key requires the simultaneous depression of a justification key to start the motor and accomplish the functions of the justification space key as well as those of the justification key.

14. A pneumatic keyboard composing machine comprising keys including a restoring key, punches, connecting means for selectively operating the punches in accordance with the keys struck and thus producing signal perforations in a record strip, mechanism for measuring the set widths of the types indicated by the keys, including a toothed units wheel and a toothed pawl therefor, a motor for disengaging the pawl from the units wheel, a line scale indicator geared to the units wheel, and means including drive and restoring cylinders for driving the indicator and restoring it to initial position, a relay valve device comprising a cylindrical casing provided with suitable ports and a plunger valve therein with a plurality of reduced portions forming channels to connect the ports, a system of pipes including pipes normally conducting air under pressure through certain of the ports and one of the channels to the drive cylinder and other pipes normally exhausting the units wheel pawl motor, through certain other ports and another channel of the plunger, a pipe connected with the restoring key to conduct air to the end of the plunger and move it against spring pressure to restoring position as a result of striking the restoring key, said plunger having its channels of sufficient length and location with respect to the ports as to first reverse air during said plunger movement from the drive cylinder to the restoring cylinder and then conduct air to the pawl motor, while upon release of the restoring key and on the return movement of the plunger, air is first exhausted from the pawl motor to permit the pawl to engage its teeth with the teeth of the units wheel and then air is admitted again to the drive cylinder thus ensuring that the engagement of the pawl and the units wheel is accomplished while the line scale indicator and the units wheel are at rest in initial position and before air is again admitted to the drive cylinder.

15. A keyboard composing machine comprising keys, punches, connecting means including a series of punch operating bars and pneumatic motors therefor, for selectively operating the punches in accordance with the keys struck to produce signal perforations indicating set values in units for the types represented by the keys, means by which the justification space key operates the 4-unit punch bar until a definite number of spaces have been indicated in a line of composition, means for switching the connection of the justification space key from operative connection with the 4-unit bar to the 6-unit bar immediately after said definite number has been indicated, guides for the punch bars, a stop on the guide for the 6-unit bar, means connecting the 4 and 6-unit bars for arresting the movement of the 6-unit bar against said stop when the 4-unit bar is operated whereby the 6-unit bar is prevented from operating as a result of the operation of the 4-unit bar.

16. A keyboard composing machine comprising keys, punches, connecting means including a series of punch operating bars and pneumatic motors therefor, for selectively operating the punches in accordance with the keys struck to produce signal perforations indicating set values in units for the types represented by the keys, means by which the justification space key operates the 4-unit punch bar until a definite number of spaces have been indicated in a line of composition, means for switching the connection of the justification space key from operative connection with the 4-unit bar to the 6-unit bar immediately after said definite number has been indicated, guides for the punch bars, a stop on the guide for the 6-unit bar, a laterally extending pin on the 4-unit bar, a cam structure on the 6-unit bar extending rearwardly and laterally and provided with a cam slot to co-operate with said pin, whereby the operation of the 4-unit bar causes its pin to drive the cam structure of the 6-unit bar rearwardly to contact with said stop and prevent further operative movement of the 6-unit bar, thus preventing the operation of the latter under the abnormal condition of the motors of both bars being simultaneously actuated in connection with the operation of switching from 4 units to 6 units.

17. A keyboard composing machine comprising keys including character and justification keys, punches, connecting means for selectively operating the punches in accordance with the keys struck and thus producing signals in the form of perforations in a paper record strip, measuring mechanism for the values setwise of the character keys struck, a justification quadding scale co-operative with the measuring mechanism and comprising indicia in the form of figures indicating the justification keys to be struck, said figures being at the intersections of vertical rows or columns representing ems and horizontal rows representing units, said scale also being divided into vertical zones, each including a plurality of columns of said figures, and representing progressively increasing fixed values in ems, special keys for recording the zone values, the figures at the intersections of vertical columns and horizontal rows representing the shortage value to be added to the justification spaces in a line of composition after the zone values in which the intersections occur have been subtracted whereby the quadding operation necessitates the use of relatively few key strokes.

18. A keyboard composing machine comprising keys including character and justification keys, punches, connecting means for selectively operating the punches in accordance with the keys struck and thus producing signals in the form of perforations in a paper record strip, measuring mechanism for the values setwise of the character keys struck, a justification quadding scale co-operative with the measuring mechanism and comprising indicia in the form of figures indicating the justification keys to be struck, said figures being at the intersections of vertical rows or columns representing ems and horizontal rows representing units, said scale also being divided into vertical zones, each including a plurality of columns of said figures, and representing progressively increasing fixed values in ems, special keys for recording the zone values, including a key indicating twice the value of the other special keys struck, the figures at the intersections of vertical columns and horizontal rows representing the shortage value to be added to the justification spaces in a line of composition after the zone values in which the intersections occur have been subtracted whereby the quadding operation necessitates the use of relatively few key strokes, and the special key indicating twice the value of the other special keys permits half the quadding to be accomplished ahead of the composition and half thereafter, thus causing the centering of the composition in the line.

19. In a keyboard of the kind described, a quadding and centering scale comprising a cylindrical drum provided with indicia in the form of figures indicating the justification keys to be struck, said figures being at the intersections of vertical rows or columns representing ems and horizontal rows representing units, said drum also being divided into vertical zones each including a plurality of said figures and representing progressively increasing fixed values of ems, the figures at the intersections of vertical columns and horizontal rows representing the shortage value to be added to the justification spaces in a line of composition after the zone values in which the intersections occur have been subtracted.

20. A keyboard composing machine comprising keys, including a special key, measuring mechanism including a series of stops, a units wheel and a units rack, means for interposing a selected stop in the path of the rack upon the depression of a key to measure the set value for that key, a cradle for housing said stops and being provided with an abutment for said stops, a pneumatic motor operated by the depression of the special key, said motor moving said abutment a definite number of units in the direction of movement of said rack, whereby the rack may be made to travel said definite number of units in addition to its normal travel to come against an interposed stop and thus cause the measurement of the set value of a key struck to be increased by said definite number of units.

21. A keyboard composing machine comprising keys, punches, connecting means for selectively operating the punches in accordance with the keys struck and thus producing signals in the form of perforations in a paper record strip, measuring mechanism including scales located centrally above the keys, a justification drum, gearing including a chain or belt for operating the drum from the measuring mechanism, a quadding drum, gearing including a chain or belt for operating the quadding drum from the measuring mechanism, the two drums being above the measuring mechanism, and to the right thereof on approximately the level of the operator's eyes, a copy holder on approximately the same level and located to the left and above the measuring mechanism, means for adjusting the copy holder angularly and in a front and back direction, said copy holder being provided with a knurled handle for manually moving the copy, whereby easy reading of the copy and of the indicia of the two drums and the measuring scales is thus provided.

MAURITZ C. INDAHL.